US008934633B2

(12) United States Patent
Tomaru

(10) Patent No.: US 8,934,633 B2
(45) Date of Patent: *Jan. 13, 2015

(54) ENCRYPTED COMMUNICATION SYSTEM, TRANSMITTER AND RECEIVER USING SAME

(75) Inventor: Tatsuya Tomaru, Hatoyama (JP)

(73) Assignee: Hitachi, Ltd., Toyko (JP)

( * ) Notice: Subject to any disclaimer, the term of this patent is extended or adjusted under 35 U.S.C. 154(b) by 216 days.

This patent is subject to a terminal disclaimer.

(21) Appl. No.: 13/578,016

(22) PCT Filed: Jan. 17, 2011

(86) PCT No.: PCT/JP2011/050668
§ 371 (c)(1),
(2), (4) Date: Aug. 9, 2012

(87) PCT Pub. No.: WO2011/099325
PCT Pub. Date: Aug. 18, 2011

(65) Prior Publication Data
US 2012/0314867 A1 Dec. 13, 2012

(30) Foreign Application Priority Data
Feb. 15, 2010 (JP) .................................. 2010-029894

(51) Int. Cl.
*H04N 7/167* (2011.01)
*H04L 9/08* (2006.01)
(52) U.S. Cl.
CPC ........................................ *H04L 9/08* (2013.01)
USPC ........... 380/278; 380/255; 380/268; 380/277; 380/283; 380/44; 398/188; 398/200; 340/5.26; 340/5.54; 340/5.65; 713/150; 713/151; 713/168; 713/171; 713/169; 726/27; 726/28; 726/29; 726/2; 726/21

(58) Field of Classification Search
CPC ... H04L 9/0852; H04L 9/0883; H04L 9/0858; H04B 10/70
See application file for complete search history.

(56) References Cited

U.S. PATENT DOCUMENTS 5,206,905 A * 4/1993 Lee et al. ......................... 705/55
6,801,626 B1 * 10/2004 Nambu ........................ 380/256
(Continued)

FOREIGN PATENT DOCUMENTS

| JP | 2007-129386 | 5/2007 |
|---|---|---|
| JP | 2008-3339 | 1/2008 |

(Continued)

OTHER PUBLICATIONS

Nicolas Gisin, et al, Quantum cryptography, Reviews of Modern Physics, Jan. 2002, pp. 145-195, vol. 74, No. 1.
(Continued)

*Primary Examiner* — Morshed Mehedi
*Assistant Examiner* — Sharon Lynch
(74) *Attorney, Agent, or Firm* — Antonelli, Terry, Stout & Kraus, LLP.

(57) ABSTRACT

High-security communications against information leakage as well as high-speed communications are realized using present optical fiber networks. The methods are as follows: (1) A seed key is shared between a transmitter and a receiver in advance. Random numbers are transmitted using carrier light accompanied by fluctuations and bases that are decided by random numbers. The transmitter and receiver compare a shared basis that is determined by the seed key with the random basis, and decompose the random numbers superimposed on each bit into two sequences, based on whether the shared basis coincides with the random basis or not. Error correction is processed for each sequence in the receiver, and then the random numbers are shared between the transmitter and the receiver. (2) The amount of the random numbers shared between the transmitter and the receiver is reduced to secret capacity through privacy amplification, and the resultant random numbers are used as a secret key. (3) Real data are encrypted with the obtained secret key, and they are transmitted and received.

20 Claims, 17 Drawing Sheets

(56) References Cited

U.S. PATENT DOCUMENTS

| | | | |
|---|---|---|---|
| 7,181,011 B2* | 2/2007 | Trifonov | 380/256 |
| 7,831,049 B1* | 11/2010 | Kanter | 380/256 |
| 8,175,273 B2* | 5/2012 | Kawamoto et al. | 380/263 |
| 2005/0259825 A1* | 11/2005 | Trifonov | 380/277 |
| 2006/0093143 A1 | 5/2006 | Maeda et al. | 380/256 |
| 2006/0280509 A1* | 12/2006 | Tomaru et al. | 398/188 |
| 2007/0058810 A1* | 3/2007 | Tanaka et al. | 380/210 |
| 2007/0064945 A1* | 3/2007 | Yuan et al. | 380/263 |
| 2007/0297810 A1* | 12/2007 | Tomaru | 398/200 |
| 2008/0031637 A1* | 2/2008 | Tomaru | 398/188 |
| 2009/0323955 A1* | 12/2009 | Ikushima et al. | 380/268 |
| 2010/0208893 A1* | 8/2010 | Toyoshima et al. | 380/256 |
| 2011/0311050 A1* | 12/2011 | Tomaru | 380/256 |

FOREIGN PATENT DOCUMENTS

| | | |
|---|---|---|
| JP | 2009-296217 | 12/2009 |
| JP | 2010-35072 | 2/2010 |

OTHER PUBLICATIONS

Geraldo A. Barbosa et al., Secure Communication using Mesoscopic Coherent States, Physical Review Letters, Jun. 6, 2003, vol. 90, No. 22.

A. D. Wyner, The Wire-Tap Channel, The Bell System Technical Journal, Oct. 1975, vol. 54, No. 8.

Ueli M. Mauer, Secret Key Agreement by Public Discussion from Common Information, IEEE Transactions on Information Theory, May 1993, pp. 733-741, vol. 39, No. 3.

Charles H. Bennett, et al., Generalized Privacy Amplification, IEEE Transactions on Information Theory, Nov. 1995, pp. 1915-1923, vol. 41, No. 6.

\* cited by examiner

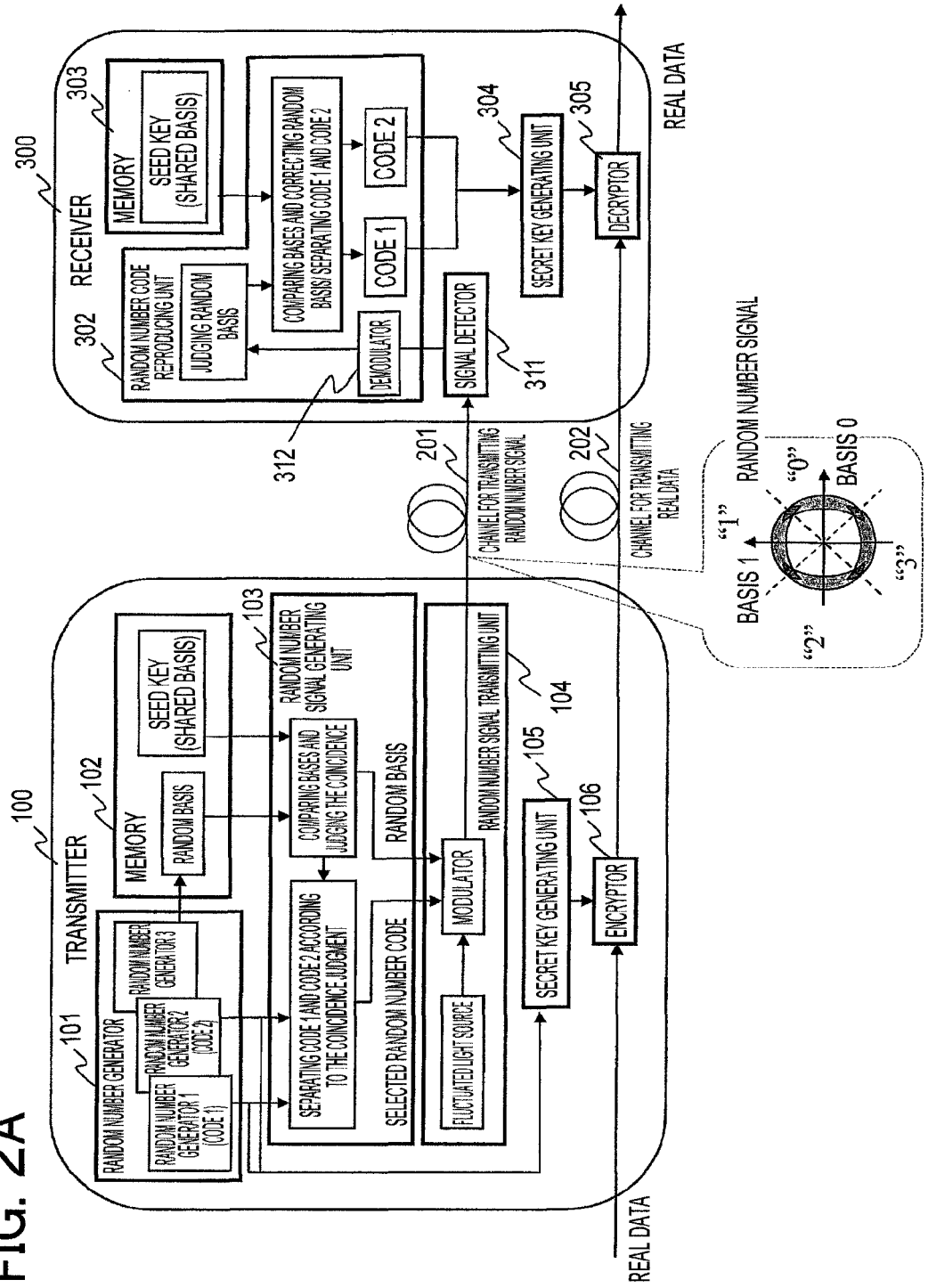

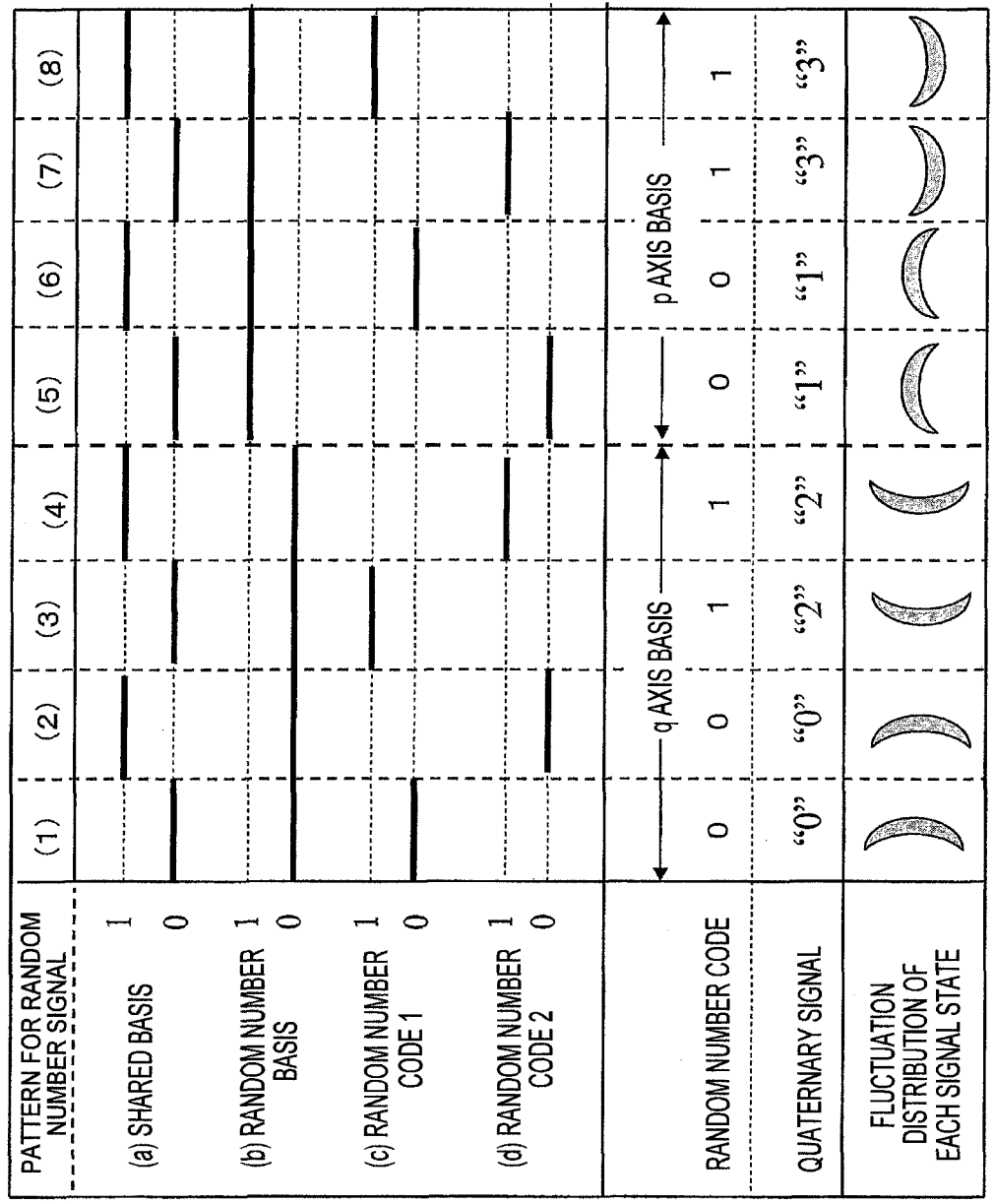

FIG. 2C

| PATTERN FOR RANDOM NUMBER SIGNAL | (1) | (2) | (3) | (4) | (5) | (6) | (7) | (8) |
|---|---|---|---|---|---|---|---|---|
| FLUCTUATION DISTRIBUTION OF EACH SIGNAL STATE | | | | | | | | |
| OBTAINED QUATERNARY SIGNAL | "0" | "0" | "2" | "2" | "1" | "1" | "3" | "3" |
| JUDGMENT OF RANDOM NUMBER BASIS | q AXIS BASIS | | | | | p AXIS BASIS | | |
| BASIS COMPARISON — RANDOM NUMBER 1 BASIS | 0 | 1 | 0 | 1 | 1 | 0 | 0 | 1 |
| SHARED BASIS | 0 | 1 | 1 | 1 | 1 | 1 | 1 | 1 |
| JUDGMENT AND OUTPUT OF RANDOM NUMBER CODE — RANDOM NUMBER CODE 1 | 1 | 0 | | | 1 | 0 | 1 | 0 |
| RANDOM NUMBER CODE 2 | 0 | 1 | | | 1 | 1 | 0 | 1 |

ENCRYPTED COMMUNICATION SYSTEM, TRANSMITTER AND RECEIVER USING SAME

TECHNICAL FIELD

The present invention relates to a cryptographic communication system and a transmitter and a receiver using the same, and more particular, to a cryptographic communication system with improved security in optical communication and a transmitter and a receiver using the same.

BACKGROUND ART

In communication, a demand for confidentiality is an everlasting theme from ancient times to the future. In recent network society, the demand for confidentiality has been achieved with the development of cryptology. Cryptography may be classified into common-key cryptosystems and public-key cryptosystems. The security of the common-key cryptosystems is based on the fact that it is difficult to cryptanalyze ciphertext even when it is eavesdropped on, and the security of the public-key cryptosystems is based on the fact that it takes impractical time to cryptanalyze ciphertext even though cryptanalysis algorithm is known. However, there is a possibility that an effective cryptanalytic method may be found out in case of the common-key cryptosystems, and there is a possibility that a faster cryptanalysis algorithm than the currently known one may be found out in case of the public-key cryptosystems. In addition, when a quantum computer is realized, it is relatively easy to cryptanalyze ciphertext even using the existing algorithms for the public-key cryptosystems. Therefore, quantum cryptography has been interested recently.

Quantum cryptography is to ensure security according to physical law using quantum mechanical properties. The security of ordinary cryptography is based on the fact that a current computer does not have efficient capability to cryptanalyze eavesdropped ciphertext. On the other hand, quantum cryptography physically realizes security, and therefore, has no problem of being cryptanalyzed even if cryptanalysis or computers are improved (Non-Patent Document 1). However, quantum cryptography still has many problems because quantum mechanical states are necessarily used. Quantum mechanical states may easily change from an original state to another state through the interaction with environment (decoherence). Loss is inevitable in transmission channels such as optical fibers. The fact that a quantum state changes through loss means that quantum cryptography is applicable only to a limited transmission distance. A maximum transmission distance is, for example, about 100 km. When there is loss in transmission line, signals are usually amplified so as to compensate for the loss. However, the amplification causes decoherence for the original state, and therefore, the amplification is not allowed in quantum cryptography. In addition, quantum cryptography needs to use ultralow-power light. Furthermore, the present optical communication systems need to be reconstructed for operating quantum cryptography because of the limitation problems. As described above, there are many limitations in operating quantum cryptography.

A method that is called αη scheme was proposed to solve the above problems in quantum cryptography. The method uses multiple signal bases in phase space and neighboring bases are set within quantum fluctuation so as not to provide eavesdroppers with accurate information (Non-Patent Document 2). This scheme uses the quantum fluctuation to guarantee security, and therefore, when signal light intensity is too large, sufficient security cannot be obtained because the effect of the quantum fluctuation becomes negligible. Although this scheme uses light intensity larger than quantum cryptography, it requires sufficiently lower intensity than that in ordinary optical communication. However, practical communication systems require light intensity on the level of ordinary optical communication. For this requirement, a method of using antisqueezing was proposed (Patent Document 1). This method makes eavesdropping difficult using the multi-value bases and the antisqueezed (expanded) fluctuations. The antisqueezed fluctuations are sufficiently larger than the quantum fluctuation and may be referred to as classical fluctuations rather than the quantum mechanical one. This method was devised under the precondition that the method is applied to the general optical communication. Patent Document 2 discloses an example of methods satisfying the precondition, and the antisqueezed light generator is constructed by using only components for optical communication having long-term reliability.

So far, cryptographic communication has been described from the physics point of view. Meanwhile, when considering the security of communication from the information theoretic point of view, it has been known that the security does not depend on whether the signal light is quantum mechanical or classical (Non-Patent Document 3 and 4). In this sense, quantum cryptography is interpreted as one of methods according to the general information theory.

The method for realizing secure communication may be divided into several processes. One of the processes is privacy amplification. Non-Patent Document 5 discloses a method for generating a secret key through the privacy amplification.

RELATED ART DOCUMENTS

Patent Document

Patent Document 1: Japanese Patent Application Laid-Open Publication No. 2007-129386 A
Patent Document 2: Japanese Patent Application Laid-Open Publication No. 2008-003339 A

Non-Patent Document

Non-Patent Document 1: N. Gisin, G. Ribordy, W. Tittel and H. Zbinden, Rev. Mod. Phys. 74, 145-195 (2002)
Non-Patent Document 2: G. A. Barbosa, E. Corndorf, P. Kumar and H. P. Yuen, Phys. Rev. Lett. 90 (2003) 227901
Non-Patent Document 3: A. D. Wyner, "The wire-tap channel," Bell Syst. Tech. J., 54, 1335 (1975)
Non-Patent Document 4: U. M. Maurer, "Secret key agreement by public discussion from common information," IEEE Trans. Inf. Theory, 39, 733 (1993)
Non-Patent Document 5: C. H. Bennett, G. Brassard, C. Crepeau, and U. U. Maurer, "Generalized privacy amplification," IEEE Trans. Inf. Theory 41, 1915 (1995)

SUMMARY OF THE INVENTION

Problems to be Solved by the Invention

Secret capacity is obtained as $C_s \geq \max[I(X;Y)-I(X;Z)]$ by using the difference between mutual information $I(X;Y)$ between a sender and a legitimate receiver and mutual information $I(X;Z)$ between the sender and an illegal receiver. The mutual information $I$ is a function of a bit error rate (BER). It coincides with information source entropy $H(A)$ of the sender when there is no bit error and decreases with the increase in the BER. When the BER ($p_E$) of the illegal receiver is larger than the BER ($p_B$) of the legitimate receiver, secret capacity of $C_s \geq 0$ is obtained and secure communication can be possible information theoretically. The important point for realizing information theoretic security is how to make the difference between the legitimate receiver and the illegal receiver to realize $p_E > p_B$. When using quantum mechanical properties, the legitimate sender and receiver can detect eavesdropping. Quantum cryptography uses the quantum mechanical properties to realize $p_E > p_B$, but it does not use the quantum mechanical properties except for the part. As apparent from the above discussion, secure communication is possible if there is a method of realizing $p_E > p_B$, independent of using quantum mechanical properties or not.

Quantum cryptography can remarkably improve the security in theory, but does not have sufficient tolerance against loss and amplification, and therefore, is limited in a transmission distance. Furthermore, as the transmission distance increases, the transmission loss increases, and a probability that even a photon cannot reach a receiver increases because quantum cryptography uses ultralow-intensity light. In addition, in a protocol of general quantum cryptography, a receiving rate is further reduced because of discarding a half of received random number signals without using it. The above mentioned problems fundamentally come from the fact that quantum cryptography uses quantum mechanical properties.

Therefore, one method for solving the above problems is to realize secret optical communication using classical light, which is an unsolved problem. This problem should not be limited in optical communication, and the problem should be solved in general communications using electromagnetic waves, such as conventional electrical communication, wireless communication, and the like.

An object of the present invention is to provide a secure cryptographic communication system using classical fluctuations and a transmitter and a receiver using the same. The system should have tolerance against loss and amplification and sufficiently high transmission rate.

Means of Solving the Problems

A representative example of the present invention is described below. A cryptographic communication system including a transmitter and a receiver connected with each other via a communication network, wherein the transmitter stores the information of a shared bases shared between the transmitter and the receiver and the information of random bases stored at or generated by only the transmitter, wherein the transmitter includes a function that generates random number data from the four kinds of information, i.e., first and second random numbers generated with random number generators, the shared bases, and the random bases;

a function that generates random number signals by superimposing the random number data on the output from an electromagnetic wave source using the random bases, and transmits the generated random number signals to the receiver via a first transmission channel in the communication network; and a function that generates a secret key from the first random number and the second random number, encrypts real data to be transmitted using the secret key, and transmits the encrypted real data to the receiver via a second transmission channel in the communication network, wherein the first random number is selected as a signal when the random basis coincides with the shared basis, and the second random number is selected as a signal when the random basis does not coincide with the shared basis, wherein the receiver stores the information of the shared bases, wherein the receiver includes a function that decides the random basis and the random number value of the random number signal transmitted from the transmitter, compares the random basis with the shared basis, judges the random number signal to be the first random number when the random basis coincides with the shared basis, and judges the random number signal to be the second random number when the random basis does not coincide with the shared basis, a function that produces the secret key from the judged first and second random numbers, and a function that decrypts the encrypted real data transmitted via the second transmission channel into the pre-encrypted real data using the secret key.

Effects of the Invention

Although the present invention uses a seed key, a secret key is newly generated from fluctuations of carrier light (electromagnetic wave). That is, the newly generated secret key is generated information theoretically under the condition that the seed key is used. For this reason, the security of this system exceeds computational security and it is expected that there are no valid attacks other than a brute force attack with respect to the seed key. In cryptography, when there are no more valid attacks than the brute force attack with respect to the seed key, the cryptography is considered to be sufficiently secure. In this meaning, the present invention realizes a sufficiently secure communication system. Furthermore, the fluctuations used in the present invention are classical, and therefore, this system has the tolerance against loss and amplification and is not limited in transmission distance, which is different from the case of transmitting quantum states. According to the present invention, the present optical fiber network can be used and secure communication can be realized over a long distance. Furthermore, the present invention does not cause the loss of signals in the middle of the communication channel that may occur in general quantum cryptography and can improve the bit rate because a half of the received random number string is not discarded.

BRIEF DESCRIPTION OF THE DRAWINGS

FIG. 2A is a block diagram schematically showing a cryptographic communication system according to the present invention.

FIG. 2B is a diagram schematically showing how to treat random number signals in the transmitter of the system shown in FIG. 2A.

FIG. 2C is a diagram schematically showing how to treat random number signals in the receiver of the system shown in FIG. 2A.

MODE FOR CARRYING OUT THE INVENTION

Prior to detailed embodiments of the present invention, general matters that are a point of the present invention will be first described. In order to improve security of communication according to the present invention, fluctuations of signal light is important. An illegal receiver has difficulty of cryptanalysis due to complexity of protocol even without fluctuations, but the fluctuations are important so as to obtain sufficient security. The light fluctuations may be divided into amplitude fluctuations and phase fluctuations. In the present invention, any fluctuations are applicable, but the phase fluctuations will be mainly described as an example in the following embodiments. A coding method is a phase coding type because phase fluctuations are used. Both types of phase-shift keying (PSK) requiring reference light and differential-phase-shift keying that is a differential type may be used. For simplicity, a signal is assumed to be binary and the number of bases is assumed to be two. The signal format is quaternary in appearance in this case. However, the present invention can be easily expanded to an n-value signal and m-value basis, where n and m are positive integers. In this case, the signal becomes an n×m value in appearance.

Figure 1:
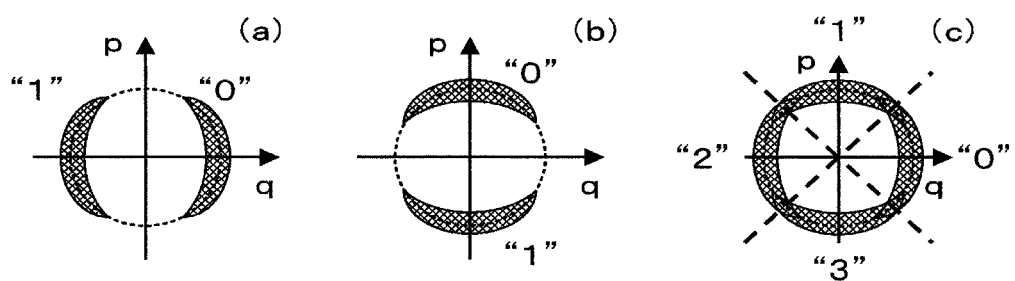
FIG. 1 is a diagram showing the physical principle of the present invention.

In order to realize secure communication, a legitimate receiver needs to be in a more advantageous condition than an illegal receiver. In order to realize it, a main point of the principle that has been adopted in the present invention is indicated in FIG. 1. A legitimate sender and receiver are assumed to share a seed key in advance and determine q-axis basis or p-axis basis using the seed key.

FIG. 1(*a*) shows binary signal states on q-axis basis, wherein a crescent shape indicates the fluctuations of each signal state "0" and "1" in phase space. When the absolute value of the amplitude of signal light is E, the signal "0" corresponds to $(q, p)=(E, 0)$ and the signal "1" corresponds to $(q, p)=(-E, 0)$, but the measured value of signal "0" becomes $(q, p)=(E+\delta q, \delta p)$ and the measured value of signal 1 becomes $(q, p)=(-E+\delta q, \delta p)$ due to carrier light fluctuations, where $\delta q$ and $\delta p$ are fluctuations. A crescent in FIG. 1 indicates the range of the fluctuations and the measured value substantially becomes any one point within the range of the fluctuations. FIG. 1(*b*) shows binary signal states for p-axis basis.

Because the legitimate receiver knows a correct basis due to the seed key, he/she can judge signals in the binary situation of FIG. 1(*a*) or 1(*b*), in principle. On the other hand, an illegal receiver does not know the seed key, and therefore, he/she sees quaternary signals as shown in FIG. 1(*c*) although he/she needs to judge them as binary signals. Neighboring fluctuations of the quaternary signals overlap more highly than those of binary signals and the BER of the illegal receiver increases accordingly. Although even the legitimate receiver slightly has bit errors, the difference from the illegal receiver is apparent. The difference in the bit error rate generates secret capacity. Here, the important point is that the legitimate receiver performs binary judgment for binary signals, and that the illegal receiver needs to perform binary judgment for quaternary signals. This difference forms that difference in the bit error rate. However, if the same key is repeatedly used simply, the illegal receiver might be able to estimate the bases. Therefore, the theme that should be solved is devising a protocol that does not allow illegal receivers estimating the bases. The present invention provides solutions for the above theme.

the following is the brief description for the communication protocols disclosed in the present invention, which will be described with reference to FIG. 1 showing the main point of the principle.

(1) A sender and a legitimate receiver share the bases by a seed key (shared bases).

(2) The sender uses electromagnetic waves with fluctuations (light, and the like) and transmits a random number signal using a random basis (quaternary as a net). Allocation of the quaternary signal is shown in FIG. 1(*c*). Signal "0" corresponds to signal "0" on q-axis basis (basis "0"), signal "1" corresponds to signal "0" on p-axis basis (basis "1"), signal "2" corresponds to signal "1" on q-axis basis (basis "0"), and signal "3" corresponds to signal "1" on p-axis basis (basis "1"). The random number signals consist of two trains, each of which is error-correcting-coded (code 1 and code 2). The random number signal on each bit is any one of the code 1 and the code 2. The shared bases and the random bases are compared with each other bit-by-bit. When the shared basis coincides with the random basis, code 1 is superimposed on the bit, and when the shared basis does not coincide with the random basis, code 2 is superimposed on the bit.

(3) The legitimate receiver first performs quaternary judgment for a signal, judges the random basis, and compares the random basis with the shared basis.

(4) When the shared basis coincides with the random basis, the random number signal is treated as code 1, and when the shared basis does not coincide with the random basis, the random number signal is treated as code 2.

(5) A secret key is generated from the code 1 and the code 2 shared between the sender and the receiver, where the amount of the code 1 and the code 2 is reduced through privacy amplification described in, for example, Non-Patent Document 5. Real data that should be actually transmitted are cryptographically transmitted through a general transmission channel using the generated secret key.

Here, the important aspect is that the seed key (shared basis) is shared between the sender and the receiver but is not reflected on the transmitted and received information. For this reason, an illegal receiver only sees random numbers on the random bases. However, the legitimate receiver sees regularity for the random numbers, i.e., whether each random number is code 1 or code 2, due to the information of the shared basis.

As described in (3), even the legitimate receiver first needs to perform quaternary judgment. For this reason, the basis judgment error frequently occurs, but the legitimate receiver can substantially divide the random numbers into code 1 and code 2 using the information of the shared bases although there are basis judgment errors. When the parity is checked for each code string (code 1 and code 2) in this stage, a bit area including a basis judgment error can be found. The basis of each bit in the area that is deduced to have the basis judgment error is corrected and parity checking is done. These processes are repeated sequentially for every bit in the area. Correct code string is obtained through these processes.

Although the following embodiments describe the case in which light is mainly used as a carrier of signals, the present invention is applicable to general electromagnetic waves, and the present invention may be applied to general communications or wireless communications using general electrical signals. As an electromagnetic wave source with fluctuations, a high-frequency oscillator, and the like, may be used.

An example of the detailed configuration of a cryptographic communication system according to the present invention will be described with reference to FIGS. 2A to 2C.

As shown in FIG. 2A, a cryptographic communication system according to the present invention includes a transmitter 100, a receiver 300, and a first transmission channel 201 and a second transmission channel 202 connecting the transmitter with the receiver. Although the following example describes one transmitter and one receiver, it goes without saying that the present invention may be applied to communications between plural transmitters and receivers which are connected to each other via a communication network.

The transmitter 100 includes: a random number generator 101 that includes a first random number generator, a second random number generator, and a third random number generator; a memory 102 that stores a seed key (shared bases) shared between the transmitter and the receiver and the output (information of random bases) from the third random number generator, a random number data generating unit 103 that generates a random number data string for transmission from the seed key (shared bases), the random bases, the output (code 1) from the first random number generator, and the output (code 2) from the second random number generator; a random number signal transmitting unit 104 that superimposes the random number data on the output from an electromagnetic wave source (light source) accompanied by fluctuations using the random bases and that transmits the random number signals (where signals with fluctuations are substantially analog) to the receiver 300 via the first transmission channel 201; a secret key generating unit 105 that generates a secret key using the outputs (codes 1 and 2) from the first and second random number generators; and an encryptor 106 that encrypts real data using the generated secret key and that transmits the encrypted real data to the receiver 300 via the second transmission channel 202. The outputs of the first and second random number generators are error-correcting-coded, and each is represented as code 1 and code 2.

The receiver 300 includes: a signal detector 311 that detects the random number signals transmitted via the first transmission channel 201, a random number code reproducing unit 302 that separates and reproduces the code 1 and the code 2 from the received random number signals using the information of the shared bases stored in a memory 303, a secret key generating unit 304 that generates a secret key from the reproduced code 1 and code 2; and a decryptor 305 that decrypts the real data transmitted via the second transmission channel 202 using the generated secret key.

The random number data generating unit 103 in the transmitter 100 outputs a first code (code 1) as the random number data when the random basis coincides with the shared basis and outputs a second code (code 2) as the random number data when the random basis does not coincide with the shared basis. In other words, the random number data consist of code 1 and code 2 that are selected bit-by-bit.

The random number signal transmitting unit 104 superimposes the random number data on output waves (output light) from the electromagnetic wave source such as a fluctuated light source, and the like, using a modulator and transmits them as the random number signals to the first transmission channel 201. The output signals from the random number signal transmitting unit 104 include fluctuations. The source of the fluctuations is the electromagnetic wave source (light source) itself. Or, thermal fluctuations and the like are usable, where they are intentionally superimposed on driving current to the modulator or the electromagnetic wave source (light source).

The secret key generating unit 105 generates the secret key through reducing the number of bits of the first and second codes that are the outputs from the first and second random number generators in the random number generator 101.

The encryptor 106 encrypts the real data using the secret key that is output from the secret key generating unit 105 and outputs the encrypted data to the second transmission channel 202.

The signal detector 311 in the receiver 300 receives the random number signals transmitted via the first transmission channel 201.

The random number code reproducing unit 302 first demodulates the random number signals with a demodulator 312 and judges the random basis (0 or 1). Next, the random basis (digital value) is compared with the shared basis stored in the memory 303. When the random basis coincides with the shared basis, the random number signal on the bit is judged to be code 1, and when the random basis does not coincide with the shared basis, the random number signal on the bit is judged to be code 2.

The secret key generating unit 304 reduces the number of bits of code 1 and code 2 that are obtained from the random number code reproducing unit 302 to generate the secret key. This secret key is the same as that obtained in the secret key generating unit 105 in the transmitter.

The decryptor 305 decrypts the encrypted real data that have been transmitted via the second transmission channel 202 into the real data that are plain text by using the secret key generated at the secret key generating unit 304.

One characteristic of the present invention is that one random number data string is generated from two random number code strings of code 1 and code 2. This will be described with reference to FIGS. 2B and 2C. FIG. 2B schematically shows how to treat the random number data in the transmitter and FIG. 2C schematically shows how to treat the random number data in the receiver.

First, the transmitter side will be described. As described in FIG. 2B, the random number data generating unit 103 generates information with eight patterns of (1) to (8). The eight patterns are determined by four types of binary signals such as (a) shared basis, (b) random basis, (c) random number code 1 (code 1), (d) random number code (code 2). The shared basis is basis "0" in patterns (1), (3), (5), and (7) and is basis "1" in patterns (2), (4), (6), and (8). Next, the random basis is "0" in the patterns (1) to (4) and "1" in the patterns (5) to (8). The transmitting basis is decided by only the random basis, and when the random basis is "0", the transmitting basis is q-axis, and when the random basis is 1, it is p-axis. The random number data of each bit are code 1 or code 2, and are selected depending on whether the shared basis coincides with the random basis or not. When both bases coincide with each other, code 1 is selected, and when both bases do not coincide with each other, code 2 is selected. For this reason, only one of code 1 and code 2 is selected in patterns (1) to (8). Because the shared basis and the random basis coincide with each other in patterns (1), (3), (6), and (8), code 1 is selected. On the other hand, because the shared basis and the random basis do not coincide with each other in patterns (2), (4), (5), and (7), code 2 is selected. Thus, the generated random number data respectively become 0, 0, 1, 1 on q-axis basis and 0, 0, 1, 1 on the p-axis basis in order for patterns (1) to (8). When represented as the quaternary signal (signal "0" to signal "3"), the random number data respectively become 0, 0, 2, 2, 1, 1, 3, 3 in order for patterns (1) to (8).

The above random number data of eight patterns are generated from code 1 and code 2 depending on the combination of the shared basis and the random basis. Although the number of patterns is eight, actually transmitted signals are quaternary in appearance. For this reason, each value of quaternary signals corresponds to two patterns, and this duplication provides us with one of the principles for secure communication in the present invention. The random number data that are quaternary in appearance are transmitted with fluctuations from the random number signal transmitting unit 104. The fluctuations of each signal state are distributed with a crescent shape in phase space, as shown in the lowest portion of FIG. 2B.

The secret key generating unit 105 generates a secret key from code 1 and code 2 for cipher communication of the real data.

Next, the receiver side is described. FIG. 2C schematically shows how to treat the random number data in the receiver. Patterns (1) to (8) respectively correspond to patterns (1) to (8) in FIG. 2B.

The measured value of a quaternary random number signal received at signal detector 311 is one point in phase space and exists within the range of the fluctuation distribution of a crescent shape, which is shown in the top portion of FIG. 2C. The measured value is judged as a quaternary signal of "0", "1", "2", or "3" in the demodulator. A random basis is first determined through the quaternary judgment. When the quaternary signal is "0" or "2", the random basis is q-axis (basis "0"), which corresponds to patterns (1) to (4). When the quaternary signal is "1" or "3", the random basis is p-axis (basis "1"), which corresponds to patterns (5) to (8).

The judged random basis is compared with the shared basis stored in the memory 303, and whether the random number on each bit belongs to code 1 or code 2 is judged based on the compared result. For example, let us consider the case of pattern (1). Because both of the random number basis and the shared basis are the q-axis bases (basis "0"), the random number is judged to be code 1. Moreover, a quaternary judged result can determine the value of the random number code. Pattern 1 is the case of quaternary value of "0", which is judged to be code value "0" on q-axis.

The patterns (2) to (8) can be interpreted similarly based on the above judgment method. In pattern (2), because the random basis is different from the shared basis, the random number is judged to be code 2, and the code value becomes "0" on q-axis basis according to the quaternary value of "0". In pattern (3), because the random basis and the shared basis coincide with each other, the random number is judged to be code 1, and the code value becomes "1" on q-axis basis according to the quaternary value of "2". In pattern (4), because the random basis and the shared basis are different from each other, the random number is judged to be code 2, and the code value becomes "1" on q-axis basis according to the quaternary value of "2".

Patterns (5) to (8) are obtained by modifying patterns (1) to (4), where quaternary values of "0" and "2" are modified to "1" and "3," respectively. The random basis is modified from the q-axis to the p-axis based on the modification. According to the same judgment, pattern (5) becomes "0" of code 2, pattern (6) becomes "0" of code 1, pattern (7) becomes "1" of code 2, and pattern (8) becomes "1" of code 1.

The secret key generating unit 304 generates a secret key using the reproduced code 1 and code 2.

Although the random number signals that are actually transmitted through the transmission channel 201 are quaternary, there are eight data patterns, as described above. According to this fact, there are two patterns for each quaternary signal value in FIGS. 2B and 2C. For example, patterns (1) and (2) have the same quaternary signal state "0," and patterns (1) and (2) cannot be differentiated from each other if there is no information of the shared basis. This is the situation of the illegal receiver. On the other hand, the legitimate receiver holds the information of the shared bases, and therefore, patterns (1) and (2) can be differentiated from each other and code string 1 and the code string 2 can be reproduced. As a result, it is possible to generate the secret key for decrypting the encrypted signals of the real data.

As an extreme example, let us consider an eight-bit random number string consisting of a sequence of patterns (1) to (8). In this case, the shared bases are 01010101, the random bases are 00001111, and the random number code string is 00110011. The shared bases are used only inside the transmitter and the receiver and are not reflected on the transmitted and received random number signals. Because the legitimate receiver knows the shared basis, he/she can separate code strings 1 and 2 and obtain 0101 of code string 1 and 0101 of code string 2 through comparing the shared bases with the random bases. On the other hand, an illegal receiver cannot differentiate code string 1 from code string 2 because he/she has no information of the shared bases.

Here is a note. Code 1 and code 2 must be randomly mixed. Because this is one of the reasons that an illegal receiver has difficulties of cryptanalysis, it is not preferable that generated random number data are constructed from only code 1 or code 2. Thus, it goes without saying that random bases that satisfy simple conditions, such as the exactly same bases as the shared bases, simply bit-inverted shared bases, and the like, should be excluded.

The present invention realizes secret optical communication (including electrical communication) by using two basic elements. The first is to use carrier light (electromagnetic waves) with classical fluctuations (or quantum fluctuations), and the second is that the sender and the receiver share a seed key. A sender transmits binary (generally n-value, where n is a positive integer) random number signal using one of two kinds of bases (generally m kinds of bases, where m is a positive integer). Because signals are random numbers on random bases, the illegal receiver can obtain no information in principle. The legitimate sender and receiver determine the shared basis using the shared seed key. The sender and the receiver compare the random bases with the shared bases bit-by-bit and divide the random numbers on the random bases into two groups of strings (code 1 and code 2), depending on whether those bases coincide with each other or not. Because the legitimate sender and receiver share the seed key, two random number strings of the sender coincide with those of the receiver if there is no bit error. However, the basis-judgment errors generally exist due to the fluctuations of carrier light. The errors are corrected by using an error correcting code. A method for correcting the basis-judgment errors is described in the following embodiments. The legitimate receiver uses the seed key and the error-correcting function of the error correcting code. As a result, what he/she does becomes equivalent to judging binary signals on a known basis in principle. However, the illegal receiver does not have the seed key, and therefore, does not know which one of the two kinds of bases is used for transmission. The illegal receiver must perform binary judgment under the conditions. The illegal receiver sees quaternary signals in appearance. The BER in binary judgment for quaternary signals is larger than that for binary signals. The difference in BERs between the legitimate receiver and the illegal receiver is the origin of secret capacity. The mutual information between the sender and the receiver is determined by the BER. The mutual information between the legitimate sender and receiver subtracts the mutual information between the sender and the illegal receiver is the secret capacity. The sender and the receiver generate a secret key from the shared random numbers through privacy amplification, where the amount of the secret key must be less than the secret capacity. Real data are encrypted with the obtained secret key, and secure communication is realized.

Hereinafter, embodiments of the present invention will be described in detail with reference to the accompanying drawings.

First Embodiment

Figure 3:
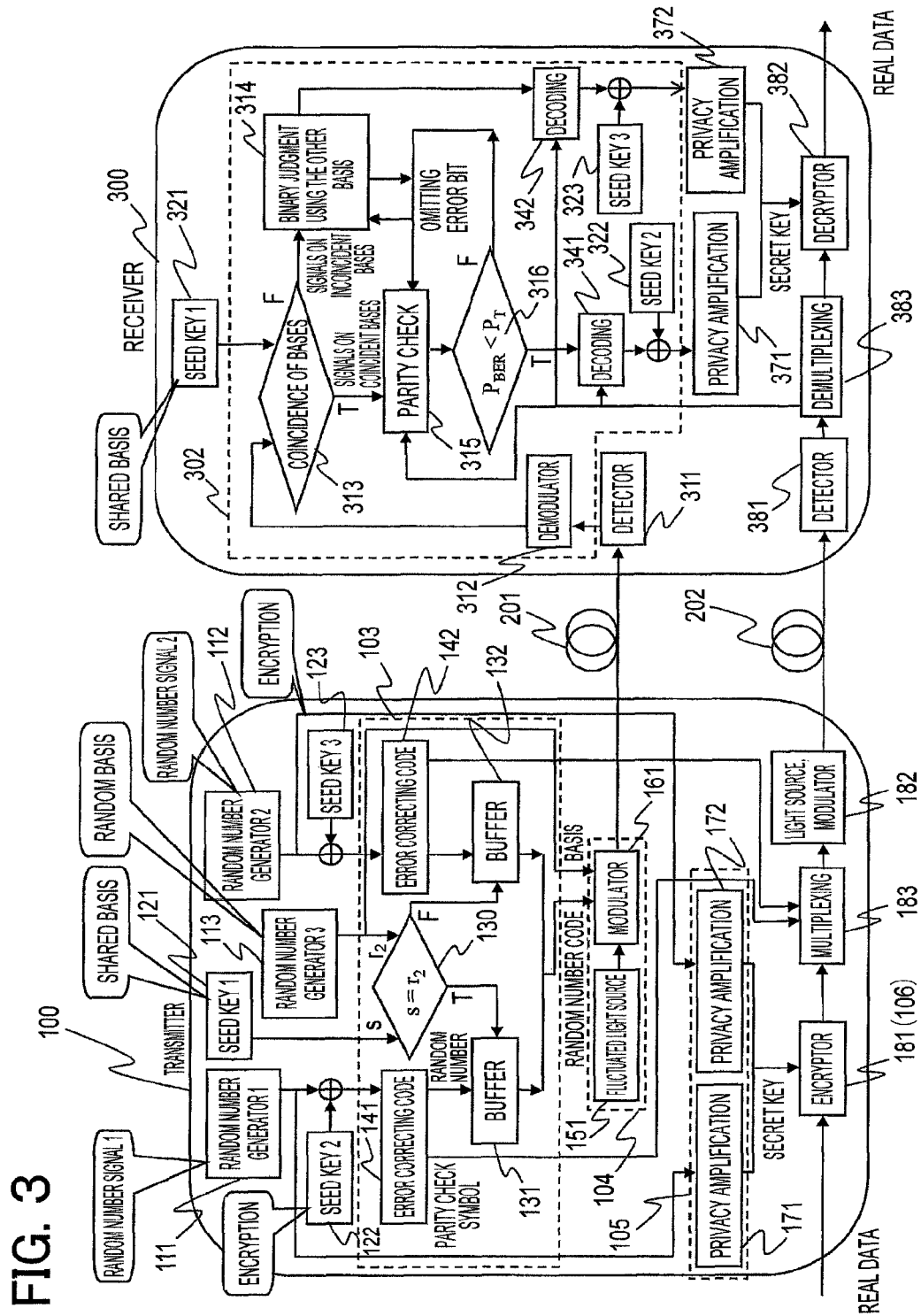
FIG. 3 is a block diagram showing an example of the configuration for a cryptographic communication system according to the first embodiment of the present invention.

When the bases and signals are of true random numbers, an illegal receiver sees only completely random number strings. FIG. 3 shows an example of the configuration for a cryptographic communication system according to the present invention. The transmitter 100 includes three random number generators 1, 2, and 3 (111, 112, and 113) and three kinds of seed keys 1, 2, and 3 (121, 122, and 123) that consist of random numbers. The random number generator 101 in FIG. 2A includes those three random number generators, and the memory 102 in FIG. 2A stores those seed keys. The three random number generators and three kinds of the seed keys respectively may be constructed from one random number generator and one seed key, where the output from one random number generator is divided into three and one seed key is divided into three. The outputs from the random number generators 1 (111) and 2 (112) are random numbers that will be used for generating a secret key. They are encrypted using seed keys 2 (122) and 3 (123) and are error-correcting-coded with encoders 141 and 142, respectively. Information symbols part and parity check symbols part are separated in error correcting coding, wherein the former is referred to as random number code and the latter is referred to as check symbols. The random number code is held in buffers 131 or 132 so as to be transmitted. The random number generator 3 (113) is used to randomize the bases and the random number code is transmitted using the random bases. The legitimate receiver needs to use the bases shared between the legitimate sender and receiver to receive signals correctly. The seed key 1 (121) is used for this purpose. The bases are completely randomized due to the random number generator 3 (113), but the legitimate receiver sees a regularity by using the seed key 1 (121).

Figure 4:
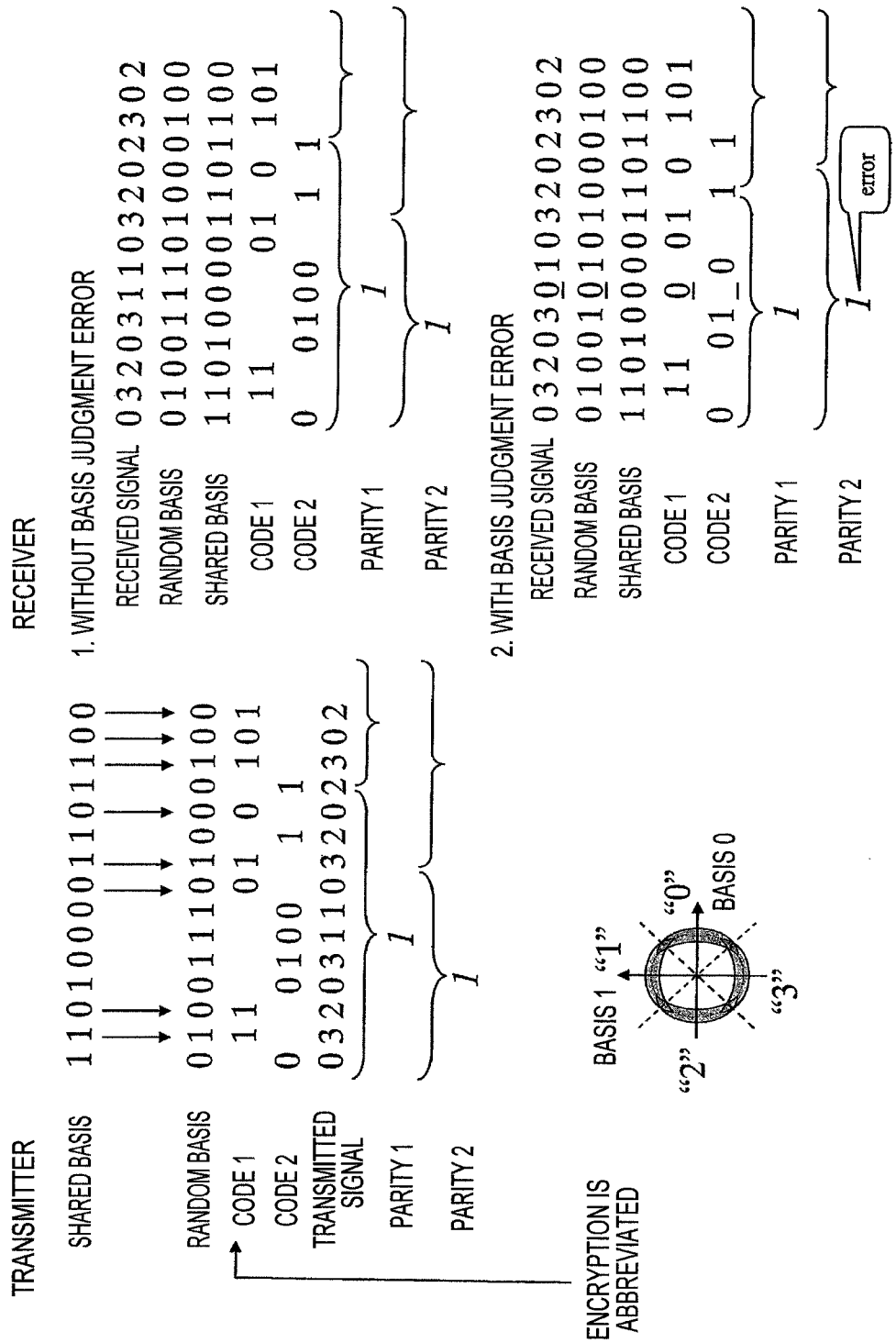
FIG. 4 is a diagram showing an example of signal treatment when the present invention is implemented based on the block diagram shown in FIG. 3.

FIG. 4 shows concrete processing for realizing it in the random number data generating unit 103. Basis is specified with "0" and "1," where the former corresponds to q-axis basis of FIG. 1(a) and the latter corresponds to p-axis basis of FIG. 1(b). The random bases that are determined by the output from the random number generator 3 (113) is 010011101000100 in FIG. 4. The basis shared between the sender and the receiver in advance is 110100001101100. The comparison and judgment of the shared basis and the random number basis are performed in comparator 130. The first basis of the shared bases is "1" in FIG. 4, and the first basis of the random bases determined by the random number generator 3 (113) is "0". Because they do not coincide with each other, a random number code 2 held at buffer 132 is transmitted using the basis "0". Signals are superimposed on output light from fluctuated light source 151 at modulator 161 in random number signal transmitting unit 104. The second output of the random bases (random number generator 3 (113)) is "1". Because the basis coincides with the second output of the shared bases in this case, random number code 1 held at buffer 131 is superimposed and transmitted. Because next shared basis and random basis both are "0", random number code 1 is again superimposed and transmitted. Hereinafter, it is likewise repeated.

In this method, which of random number codes 1 and 2 is superimposed depends on the random basis (the output from random number generator 3 (113)), and therefore, buffers 131 and 132 are provided and random number codes 1 and 2 are held therein, as shown in FIG. 3. Because the random number code is binary and the basis is binary, the transmitted signal is quaternary in appearance. Quaternary values are allocated in phase space as shown at the lower left of FIG. 4. Those quaternary signals are described as transmitted signal in FIG. 4. The random numbers described in the row of "code 1" and "code 2" indicate random number codes 1 and 2, respectively. The values described in the row of "party 1" and "party 2" indicate the parity check symbols of random number codes 1 and 2, respectively. Here, the parities of every five bits are indicated as check symbols as an example.

Because the parity check symbols generated at encoders 141 and 142 for error correcting coding are transmitted via ordinary optical channel 202, the parity check symbols are multiplexed, at signal multiplexer 183, with other signals that are transmitted via an ordinary transmission channel. This multiplexing is performed using ordinary methods such as packetizing and time-division multiplexing that are generally performed in communication. The multiplexed signals that include parity check symbols are sent to optical transmitter unit 182 consisting of a light source and a modulator, and are transmitted to the receiver 300 via optical channel 202. Multiplexed signals are received with detector 381 and converted into electric signals and sent to demultiplexer 383. The demultiplexer 383 separates the multiplexed signal strings into the state before being multiplexed, and the check symbols are separated from other signals herein.

Random number codes 1 and 2 are transmitted via optical transmission channel 201, and they are received with signal detector 311 in the receiver 300. The output signals from signal detector 311 are judged both as quaternary signals and as binary signals at demodulator 312. This processing is easy. Two quadrature components (q-axis component and p-axis component) are measured with two pairs of homodyne detectors in signal detector 311. Binary judgment (positive or negative) for output values $I_q$ and $I_p$ of respective homodyne detectors corresponds to the result of the binary judgment with respect to each basis. Quaternary judgment of "0", "1", "2", and "3" (see FIG. 4) can be performed using phase $\phi$ defined by $\arctan(I_p/I_q)$, where $I_q$ and $I_p$ are the outputs from two pairs of homodyne detections. Because the basis is randomized, even the legitimate receiver sees quaternary signals. Here, the legitimate receiver first judges which one of bases is used through the quaternary judgment. When the result of the quaternary judgment is "0" or "2", the basis is "0," and when the result of the quaternary judgment is "1" or "3", the basis is "1." The judged result on basis is compared with the shared basis that is determined by a seed key 1 (321) (the same as the seed key 1 (121) in the transmitter) at basis-coincidence check part 313. When both bases coincide with each other, the superimposed signal is judged to be random number code 1, and when they do not coincide with each other, it is judged to be random number code 2. The right side in FIG. 4 shows an example of the processing. Here, there are many basis-judgment errors because the bases are judged based on quaternary judgment, i.e., there are many errors in coincidence judging between the random basis and the shared basis.

In order to correct these errors, the parity check symbols transmitted via optical channel 202 are used at parity check part 315. When there is no error in the coincidence judging between the random number basis and the shared basis, the BER of the random number data is the preliminarily estimated low value. However, as described in the following paragraphs, when there is an error in the coincidence judging, the following bits become errors with a probability of 1/2. Therefore, if parity is checked, the area in which a bit begins to be an error can be identified. The position at which a bit begins to be an error, i.e., the position of a basis-judgment error, corresponds to the position misjudged on which one of random number codes 1 and 2 is superimposed. In order to use the information of the error position effectively, the legitimate receiver changes the basis of one bit in the identified area and checks the parity. He/she repeats the same process for every bit in the identified area in order. He/she will find a bit string that has few errors in the modified bit strings.

A concrete example that includes a bit error is also shown in FIG. 4. For simplicity, an error correcting code having an elementary parity check function is considered. The error-correction coding is performed at encoders 141 and 142. The random number data are sectioned every five bits. When the number of "1" in one section is odd, the check symbol is "1." When the number of "1" is even, the check symbol is "0." Random number code 1 is 11010101, as shown in the row of "code 1" in the transmitter side of FIG. 4. The parity of most left five bits becomes "1," which is indicated in the row of "parity 1." If there is no bit error for received signals, the parity of the received random number code 1 coincides with the value of the check symbol. Here, let us consider the case that a basis-judgment error occurs at the sixth bit from the left of the received random data in FIG. 4 as an example. The misjudged bit is underlined. In this case, the bit that is originally random number code 2 is treated as random number code 1, and therefore, the number of random number code 1 is increased by one bit.

When the receiver performs the parity check without being aware of the increase in one bit, the calculated parity does not coincide with the check symbol with a probability of 1/2 for the following bits after a basis-judgment error occurs. Thus, the position of the basis-judgment error is roughly judged. The receiver performs the process again by changing the judgment of the random basis for a bit that might be the position of the basis-judgment error. This process is repeated, and the bit string whose parity is almost correct is found. In the example of FIG. 4, the underlined bit is misjudged. When this bit is transferred from random number code 1 to random number code 2, the differentiation between random codes 1 and 2 is completed. The bases become definite at this time. There is an inverse case such that a bit that is originally judged to be random number code 2 is transferred to random number code 1. This case is similarly processed, and bases are error-corrected and become definite. Although the first process within the receiver is to perform quaternary judgment in this system, it returns to treat binary signals through the basis-error-correcting process. Performing binary judgment for binary signals has lower BER than performing binary judgment for quaternary signals. This is an information theoretical factor that a legitimate receiver is more advantageous than an illegal receiver. This advantage comes from the seed keys 1 (121 and 321) shared between the sender and the receiver in advance. That is, the legitimate receiver knowing the seed key performs the binary judgment for binary signals, but the illegal receiver needs to perform binary judgment for quaternary signals.

Although the above process on basis-judgment error is performed using the parity check symbols for random number code 1, the parity check symbols for random number code 2 or both of them can be used.

Now, bit errors are few. Residual bit errors are corrected at decoders 341 and 342 through decoding the error correcting code. Moreover, the decoded signals are decrypted using seed keys 2 (322) and 3 (323). The decrypted signals in the receiver are the reproduction of the outputs from random number generator 1 (111) and random number generator 2 (112) within the transmitter. A secret key-generating final process is as follows: Information capacity of the legitimate receiver is first determined by the BER for ordinary binary signals, where a definite basis is used. Information capacity of the illegal receiver is determined by the BER that is estimated for binary judgment of quaternary signals. Secret capacity that is the difference between information capacity of legitimate and illegal receivers is corrected with the amount of redundancy in the error correcting code. The secret key-generating final process is to reduce the reproduced random numbers, where the amount of them must be less than the corrected capacity. This process is privacy amplification. An algorithm of the privacy amplification is common between the transmitter and the receiver, and it is performed in privacy amplifiers 171, 172, 371, and 372 within the secret key generating units 105 and 304.

The privacy amplification can be realized by, for example, a logic operation. Let us assume that the random numbers shared between the sender and the receiver is "0100101110" and that secret capacity is 20% of them. When exclusive OR (XOR) is operated every five bits, the output is "01." The process treats all data equivalently and reduces the amount to its 20%. This is an example of the privacy amplification. Because the algorithm of the privacy amplification is common between the transmitter and the receiver, the sender and the legitimate receiver obtain the common secret key.

In the transmitter of FIG. 3, the privacy amplifiers 171 and 172 are used for the outputs of the random number generators 1 (111) and 2 (112), respectively, but when the outputs from the random number generators 1 (111) and 2 (112) are combined before privacy amplification, the privacy amplifier can be constructed from a single one. The configuration of two privacy amplifiers within the transmitter corresponds to a parallel process of the random numbers, and the configuration of one privacy amplifier corresponds to a serial process. Likewise, the two privacy amplifiers 371 and 372 may be constructed from a single one in the receiver.

The real data that are actually transmitted are encrypted at the encryptor 181 using the privacy-amplified secret key, are multiplexed with other signals at signal multiplexer 183, are superimposed on the carrier light in optical transmitter part 182 consisting of a light source and a modulator 182, and are transmitted to the receiver 300 via transmission channel 202.

The receiver 300 receives the transmitted signal light with detector 381 and converts the received signals into electrical signals, returns the electrical signals to the state before being multiplexed at demultiplexer 383, separates the encrypted real data from other signals, and decrypts the encrypted real data into plaintext at the decryptor 382 using the secret key. As described above, a series of processes of the secure cryptographic communication are completed.

The communication performed via optical channel 202 does not need to use fluctuated carrier light, and ordinary optical communication is preferable. Optical channels 202 and 201 may be physically different from each other, or wavelength-division multiplexing may be performed using the single optical channel.

The present invention obtains secret capacity by two characteristics. First, the seed key is used only inside a transmitter and receiver. Because not only signals but also bases for transmission are determined by random numbers, even if an illegal receiver can eavesdrop on all information, he/she cannot obtain the information on the seed key in the step of the key distribution. Second, the receiving bases are retrieved through the parity check processes. For this reason, the legitimate receiver becomes more advantageous in the BER than the illegal receiver. In other words, the probabilistic property of phase fluctuations works advantageously for the legitimate receiver. This probabilistic property and the privacy amplification make it possible to generate a new secret key. When the privacy amplification is sufficient, the information capacity of the illegal receiver gradually approaches 0.

The sender and the receiver perform the cipher communication via a general optical transmission channel (202) using the obtained secret key. Seed key-related information is exposed to the illegal receiver for the first time in this stage. For example, let us consider selective plain text attack. The illegal receiver knows the secret key through the attack. Moreover, let us assume that the illegal receiver obtains the overall information in the key distribution (communication in transmission channel 201) that is original data for the secret key. Even in this case, the illegal receiver cannot find the correlation between the secret key and the random number code if the privacy amplification is sufficient, and he/she cannot obtain the information of the seed key. For this reason, it is possible to repeatedly use the seed key. The present invention generates the secret key information theoretically under the condition that the seed key is used.

The secret capacity can be formulated as follows. Because the random basis is used for transmitting and receiving the random number code, the quaternary signal in appearance needs to be processed. However, even though the signal is quaternary in appearance, it is actually binary. The channel capacity for this case is set to be $C_f$. Mutual information $I(X;Z)$ between the sender and the illegal receiver satisfies Equation (1).

[Equation 1]

$$I(X;Z) \leq C_f \quad (1)$$

Because the sender and the legitimate receiver know seed key K, mutual information $I(X;Y)$ between them becomes $I(X;Y|K)$ that is conditional mutual information. The bases become definite through the parity check processes, and therefore, $I(X;Y|K)$ is described as channel capacity $C_b$ for binary signals. The parity check processes for retrieving bases require some information, and when the information required only for that is set to be $\delta C$, Equation (2) is obtained.

[Equation 2]

$$I(X;Y|K) \leq C_b - \delta C \quad (2)$$

Secret capacity is generally given by $C_s \geq \max [I(X;Y|K) - I(X;Z)]$. Let us assume a binary symmetric channel. Pb is defined as BER for the binary signals ($=p_B$: BER of the legitimate receiver), and $p_f$ is defined as BER for binary-judged quaternary signals ($=p_E$: BER of illegal receiver). The binary entropy function of argument p is described by Equation (3).

[Equation 3]

$$h(p) = p \log_2 p - (1-p) \log_2 (1-p) \quad (3)$$

The secret capacity is given by Equation (4).

[Equation 4]

$$C_s = h(p_f) - h(p_b) - \delta C \quad (4)$$

(Non-Patent Document 4)

The basis-correction by the parity check processes uses the parity check symbols that are included in error correcting code itself. In these processes, special information is not used, and therefore, $\delta c$ may be set to be 0 ideally. Thus, the secret capacity is described by Equation (5).

[Equation 5]

$$C_s = h(p_f) - h(p_b) \quad (5)$$

As apparent from Equation (2), secret capacity $C_s$ of Equation (5) is generated using seed key K. Therefore, if seed key K directly determines the bases in a protocol, seed key K can be used only once. However, in the present protocol, the bases are determined with random numbers and seed key K is used only inside the transmitter and the receiver. The seed key is used only to make the mutual information conditional, and it is not an origin for the secret capacity. It is the fluctuations of the signal light that generate the secret capacity of Equation (5). This is the reason that the seed key can be repeatedly used.

Figure 5:
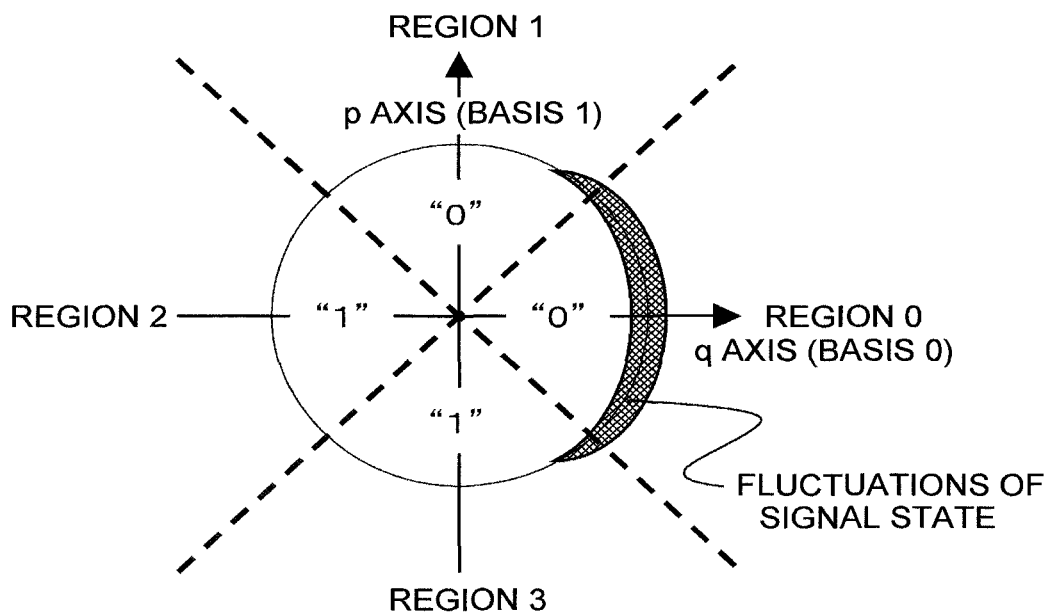
FIG. 5 is a diagram showing the relationship between the signal areas of each signal values and the fluctuations of a signal state in phase space.

Bit error rates $p_b$ and $p_f$ can be concretely estimated by assuming the distribution function $P(\theta)$ of phase fluctuations. Let us assume that a signal is "0" on q-axis basis, as shown in FIG. 5. The crescent area shown by a gray color in FIG. 5 is the range of the fluctuations of signal state. Signals "0" and "1" are allocated in the phase space. When fluctuations are sufficiently larger than quantum fluctuations, measurement can be classically treated. BER $p_b$ for binary signals is given by Equation (6) using the distribution function of signal "0" on q-axis basis.

[Equation 6]

$$p_b = \int_{-\pi}^{-\pi/2} P(\theta)d\theta + \int_{\pi/2}^{\pi} P(\theta)d\theta \quad (6)$$

The illegal receiver performs the binary judgment for quaternary signals. When signals "0" and "1" are set for each basis as shown in FIGS. 1(a) and 1(b), the illegal receiver judges "0" and "1" in FIG. 1(c) to be "0," and "2" and "3" to be "1." In this case, BER $p_f$ becomes Equation (7).

[Equation 7]

$$p_f = \int_{-\pi}^{-\pi/4} P(\theta)d\theta + \int_{3\pi/4}^{\pi} P(\theta)d\theta \quad (7)$$

BER is calculated, for example, by assuming a Gaussian distribution function given by Equation (8) for phase fluctuations.

[Equation 8]

$$P(\theta) = \sqrt{\frac{2}{\pi}} \frac{1}{\delta\theta} \exp\left[-2\left(\frac{\theta}{\delta\theta}\right)^2\right] \quad (8)$$

Figure 6:
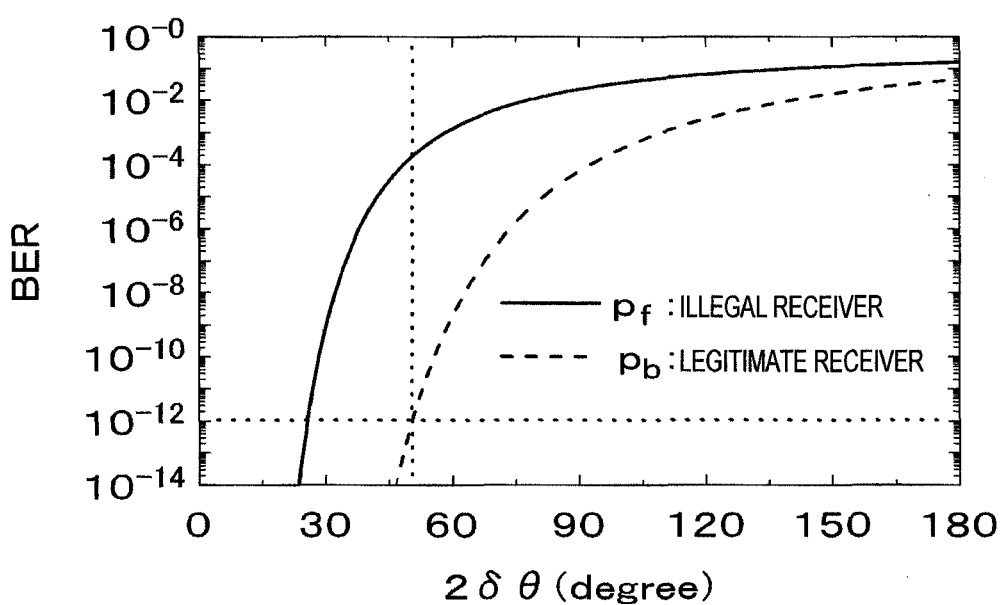
FIG. 6 is a diagram showing an example of plots indicating bit error rates of a legitimate receiver and an illegal receiver.

The BER is plotted with respect to fluctuation angle $\delta\theta$ in FIG. 6. FIG. 6 is an example of the plots showing the bit error rates of the legitimate receiver and the illegal receiver. For example, when $2\delta\theta$ is set to be 40°, the legitimate receiver receives signals by $p_b=10^{-12}$, the legitimate receiver receives signals by $p_f=10^{-4}$, and a difference of $10^8$ can be obtained.

Figure 7:
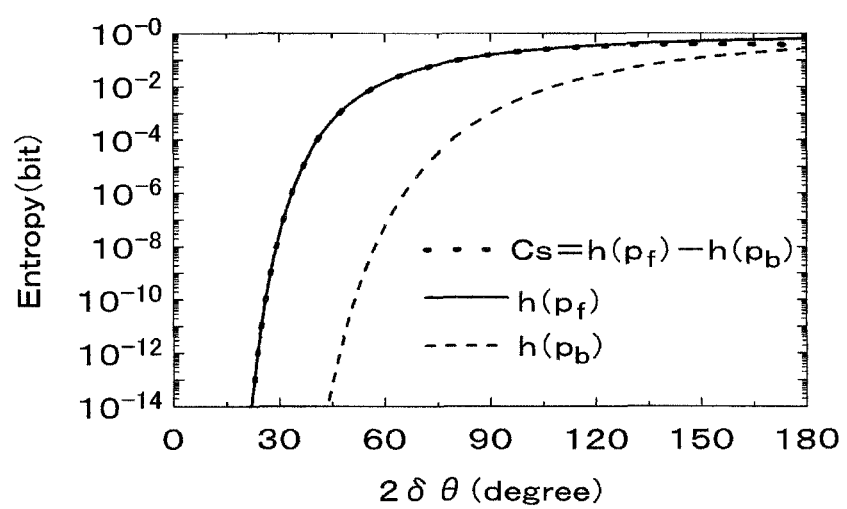
FIG. 7 is a diagram showing an example of plots indicating equivocation of a legitimate receiver and an illegal receiver and secret capacity that can be obtained from the difference between them.

FIG. 7 shows the entropy of information (equivocation $h(p_b)$ and $h(p_f)$) that is converted from the BER ($p_b$ and $p_f$). The relation of $C_s=h(p_f)-h(p_b)$ gives secret capacity. That is, FIG. 7 shows an example of the equivocations of the legitimate receiver and the illegal receiver and the secret capacity obtained from the difference between those equivocations. FIG. 7 tells that the secret capacity is roughly determined by $h(p_f)$.

The secret capacity monotonously increases with an increase in fluctuation angle $\delta\theta$ and saturates around $2\delta\theta=120°$. When only the secret capacity is considered, an optimum fluctuation is $2\delta\theta=120°$, but amounts of error correcting processes in the receiver increase with an increase of fluctuations. In addition, there is a range of an appropriate BER in the used error correcting code. The optimum fluctuation angle is decided by considering them.

Error correcting code is essential to make the secret capacity actually usable. However, if the error-correcting code becomes effective for illegal receivers also, the secret capacity disappears. Therefore, the relation of $p_b<p_t<p_f$ must be satisfied, where $p_t$ is a threshold of BER for making error correcting possible. When this condition is satisfied, the secret capacity becomes $h(p_f)-h(p_t)$.

According to the present embodiment, although the legitimate sender and receiver use a seed key, the origin of newly generated secret key is the fluctuations of carrier light and the like. That is, the newly generated secret key is generated information theoretically under the condition of using a seed key. For this reason, the security exceeds computational security, and it is expected that there is no efficient attack other than the brute force attack with respect to the seed key. When there is no more efficient attack than the brute force attack with respect to the seed key, it is considered to be sufficiently secure in cryptography. Thus, a sufficiently secure communication system can be realized. Furthermore, the fluctuations used in the present embodiment are classical, and therefore, the present embodiment has the tolerant to loss and amplification. Transmission distance is not limited, which is different from the situation where a quantum state is transmitted. According to the present embodiment, it is possible to realize secret communication over a long distance by using the present communication network consisting of optical fibers and the like. Furthermore, the present embodiment does not cause the signal loss in the middle of the communication channel that may occur in the general quantum cryptography and does not discard a half of the received random number string. These characteristics improve the bit rate.

Second Embodiment

Next, a second embodiment improving a portion of the first embodiment will be described.

In the first embodiment, information symbols part and parity check symbols part are separated from each other in error correcting coding at encoders 141 and 142, and the former that is random number code is transmitted via optical channel 201 and the latter is transmitted via optical channel 202. Because the communication via optical channel 202 is general one, the bit error rate is low and the check symbols definitely reaches the receiver. This is advantageous. Furthermore, signals transmitted via optical channel 201 are completely random numbers. This is also advantageous. However, there are some kinds of error-correcting codes that cannot separate information symbols and the check symbols. In this case, it is preferable to transmit both of the information symbols and the check symbols via optical channel 201.

Figure 8:
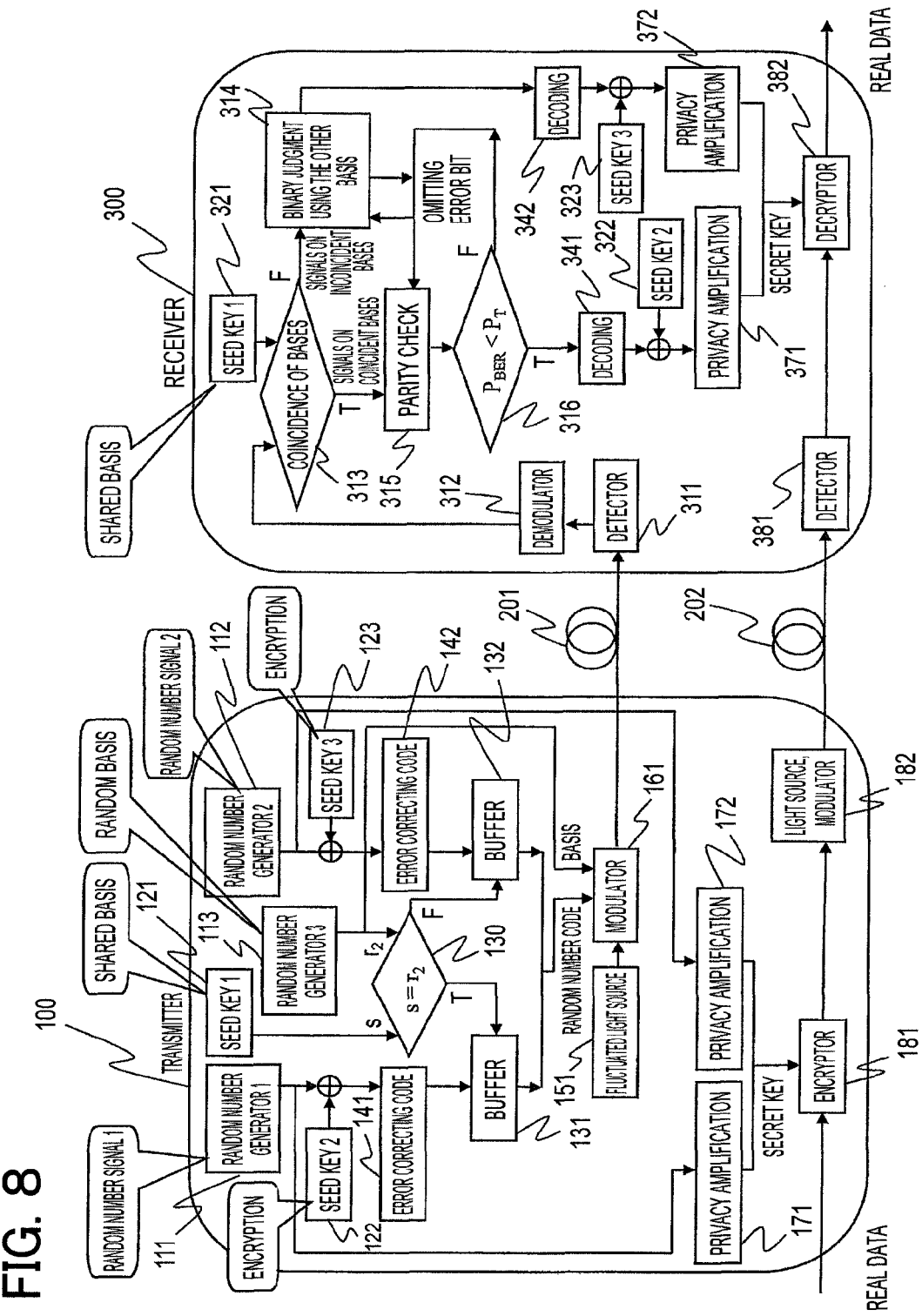
FIG. 8 is a block diagram showing an example of the configuration for a cryptographic communication system according to the second embodiment of the present invention.

FIG. 8 is a block diagram showing an embodiment for this case, that is, the second embodiment. Let us compare it with the first embodiment of FIG. 3. Because the check symbols are transmitted via optical channel 201 in FIG. 8, multiplexer 183 and demultiplexer 383 that are required in FIG. 3 is removed. Concrete signal processing is shown in FIG. 9.

Figure 9:
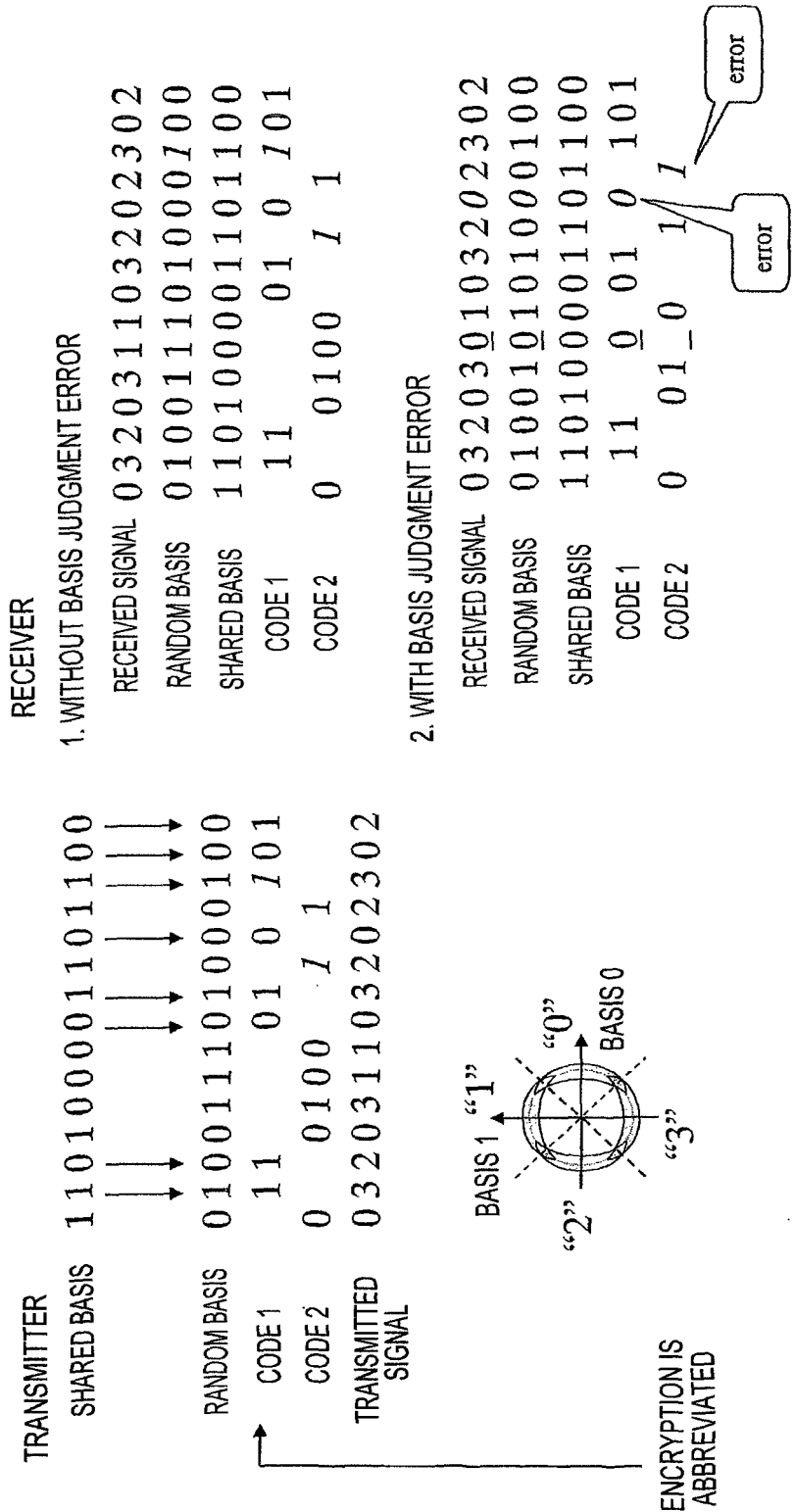
FIG. 9 is a diagram showing an example of signal treatment when the present invention is implemented based on the block diagram shown in FIG. 8.

Parity check symbols are included in the rows of "code 1" and "code 2" in FIG. 9 of the second embodiment, which is different from the case of FIG. 4 of the first embodiment. Italics express the parity of the preceding five bits that are random numbers.

When there is no basis-judgment error in the receiver, it is possible to reproduce random number codes 1 and 2. That is similar to the case of the first embodiment. When there are basis-judgment errors, the additional bits are added to or removed from the bit string of random number codes 1 and 2.

The underlined bit in FIG. 9 shows an example of basis-judgment error. Because the position of the parity check symbol deviates in this case, the legitimate receiver can specify the area including the position of the basis-judgment error, as similar to the case of the first embodiment. As similar to the case of the first embodiment, the correct bit string is recovered by sequentially repeating the processes in which the basis judgment is corrected for a bit in the area that is estimated to have the basis-judgment error and in which the parity is checked.

A point that is different from the case of the first embodiment is that the position of the check symbol changes when a basis is misjudged. Therefore, when a basis-judgment is corrected, the value of the check symbol changes every correction.

According to the present embodiment, the present invention can be realized even if the error correcting code that does not separate information symbols from check symbols is used, by transmitting both symbols via optical channel 201. Other effects are the same as those in the first embodiment.

Third Embodiment

Next, a third embodiment improving portions of functions of the first and second embodiments will be described with reference to FIGS. 10 to 13.

Figure 10:
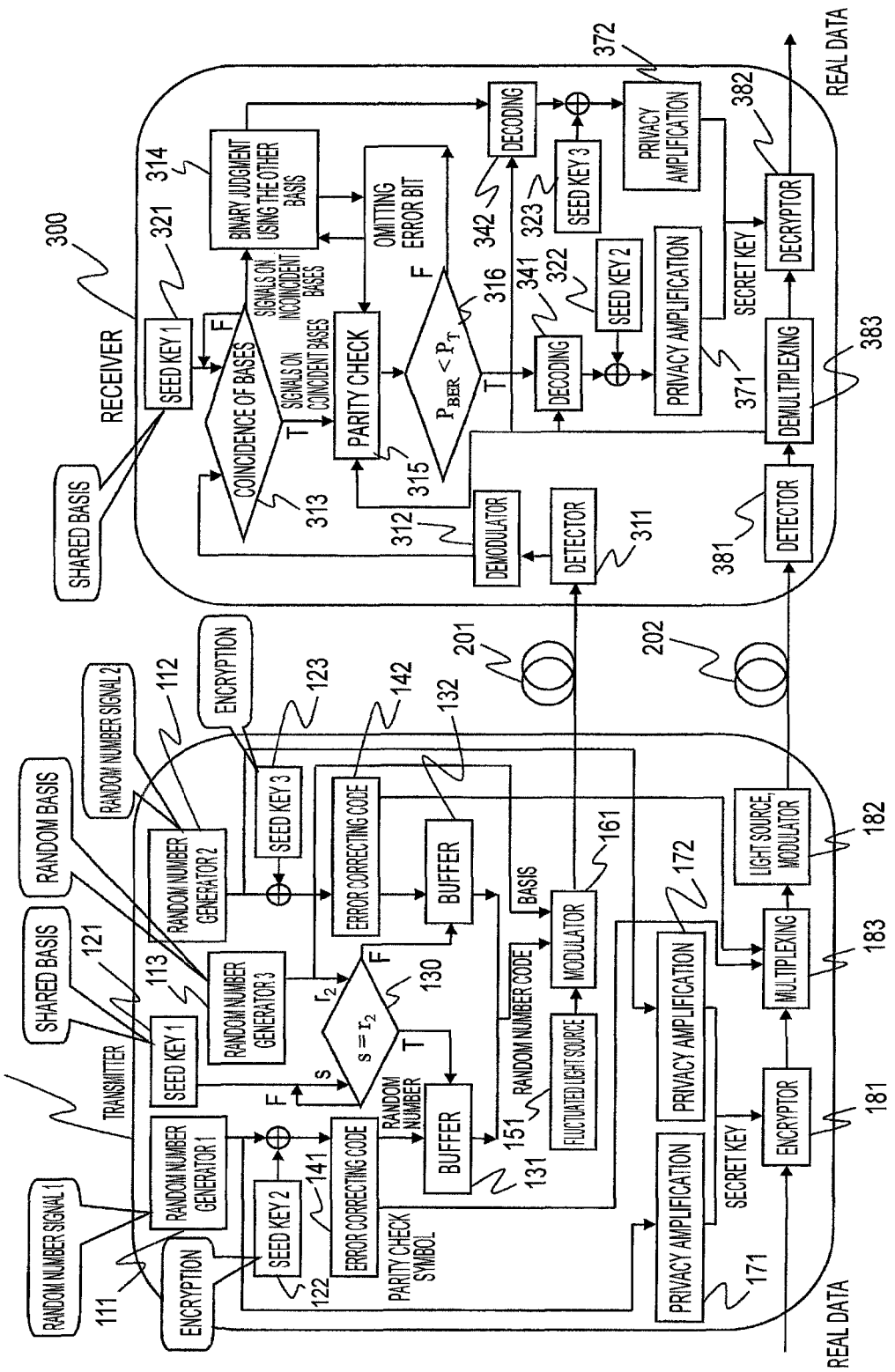
FIG. 10 is a block diagram showing an example of the configuration for a cryptographic communication system according to the third embodiment of the present invention.
Figure 12:
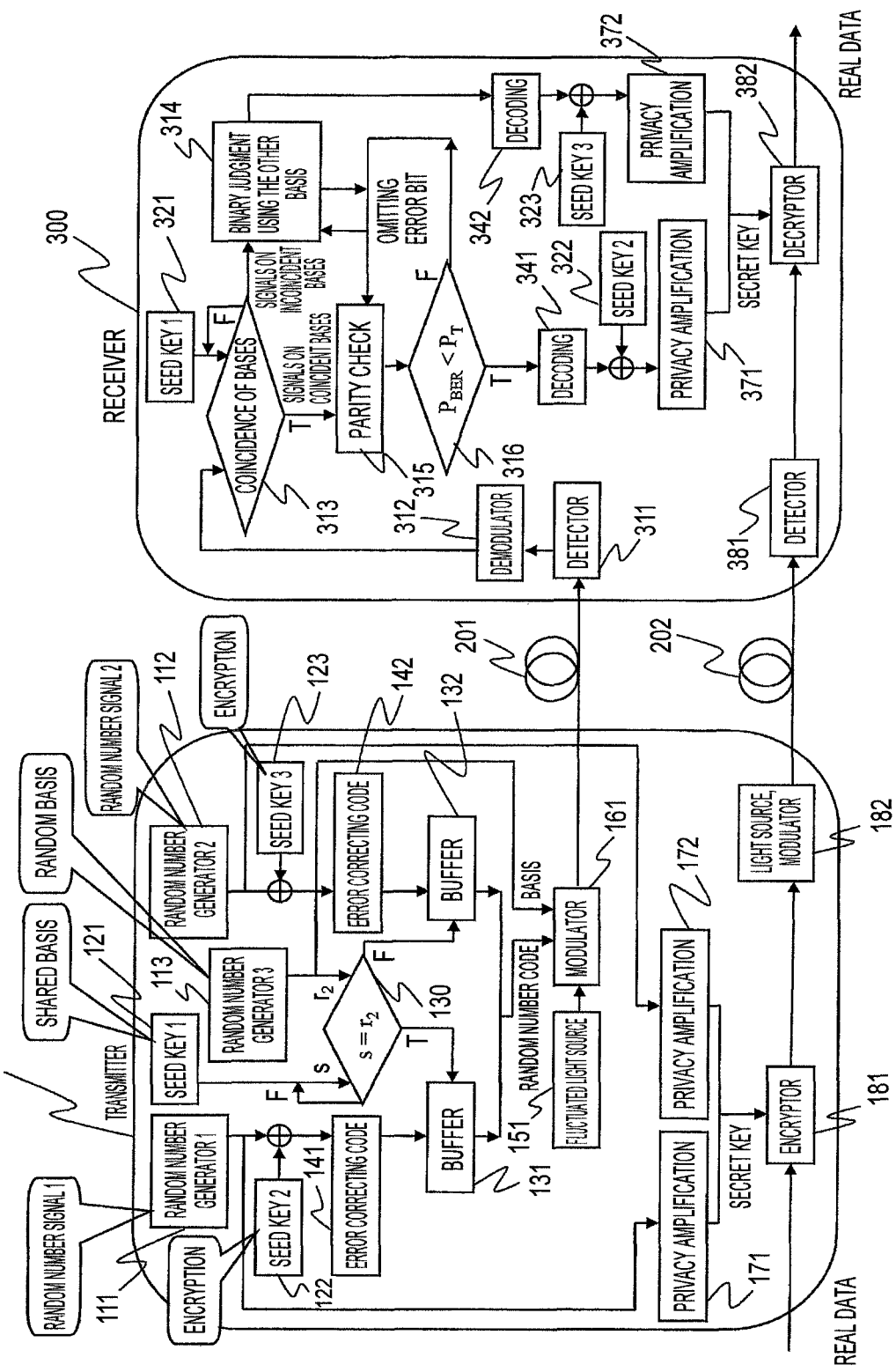
FIG. 12 is a block diagram showing another example of the configuration for the cryptographic communication system according to the third embodiment of the present invention.

In the first and second embodiments, the random basis and the shared basis are compared with each other as a pair to decide which one of random number codes 1 and 2 is transmitted. Extracting the shared bases from the random bases can be achieved by other methods than what the first and second embodiments employ. FIGS. 10 and 12 show examples of the configuration for a cryptographic communication system that employs the other methods. FIG. 10 shows a first type of the third embodiment improving the first embodiment (FIG. 3) and FIG. 12 shows a second type of the third embodiment improving the second embodiment (FIG. 8).

The present embodiment (first and second methods) are the same as the first and second embodiments in the fact that which one of random number codes 1 and 2 is transmitted is decided through comparing the shared basis with the random basis. However, when the shared basis does not coincide with the random basis, the present embodiment is different from the first and second embodiments in the fact that the unused shared basis is again compared with the next random basis to decide which one of random number codes 1 and 2 is transmitted. A shared basis is repeatedly compared with random bases until the shared basis coincides with a random basis. In other words, the arrangement of the bases on which the random number code 1 is superimposed is operated so as to coincide with the arrangement of the shared bases.

Figure 11:
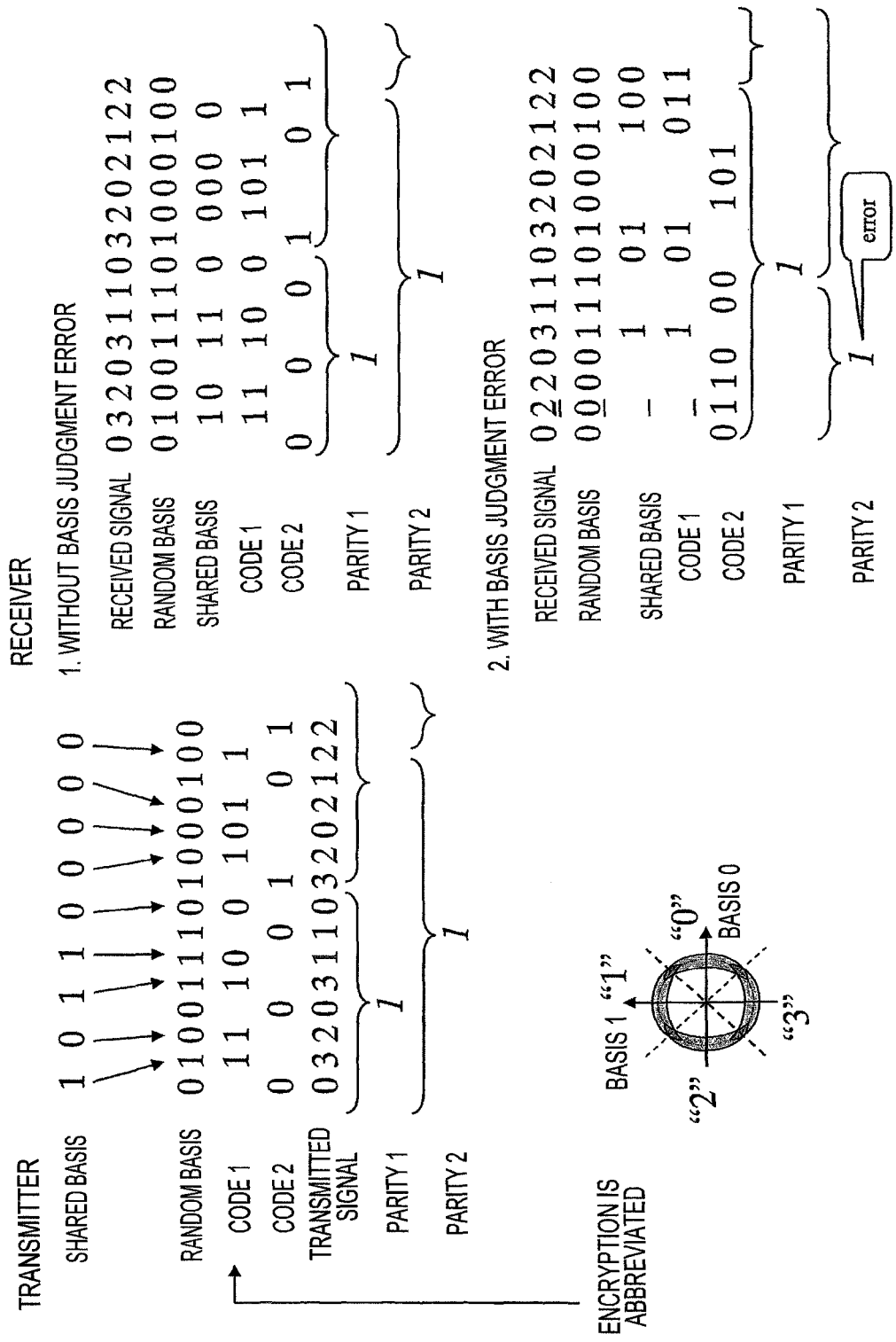
FIG. 11 is a diagram showing an example of signal treatment when the present invention is implemented based on the block diagram shown in FIG. 10.

FIG. 11 shows an example of the processes for the above-described method that are described for the case of FIG. 10. In the present embodiment, the random bases determined by the output from the random number generator 3 (113) are 010011101000100, which are the same as the examples in the first and second embodiments. The shared bases determined by seed keys 1 (121 and 131) consisting of random numbers that is shared between the sender and the receiver in advance are 101100000, which are different from the examples in the first and second embodiments.

Random number codes 1 and 2 are first prepared for transmission in the transmitter. The first basis of the shared bases is "1" in the example of FIG. 11. The first basis of the random bases determined by random number generator 3 (113) is "0," and therefore, the shared basis does not coincide with the random basis. In this case, random number code 2 (obtained through the process that the output from 112 is error-correcting-coded) is superimposed on basis "0" and is transmitted as a signal. The incoincident shared basis "1" is again compared with the next random basis. The second output of the random bases (random number generator 3 (113)) is "1". In this case, it coincides with the first basis "1" of the shared bases, and therefore, random number code 1 is superimposed and transmitted. Random number signals 1 and 2 are error-correcting-coded at encoders 141 and 142 as similar to the first embodiment, and are separated into random number code corresponding to information symbols and parity check symbols corresponding to the redundancy part. Parities of every five bits are shown in FIG. 11 as a simplified example as similar to the first embodiment.

The processing in the receiver 300 is modified according to the modification in the transmitter 100 from the processing of the first embodiment. Quaternary judgment is first performed and which basis is used is judged. This is similar to that in the first embodiment. The random basis is compared with the shared basis. When the random basis coincides with the shared basis, the signal of the bit is judged to be random number code 1, and when the random basis does not coincide with the shared basis, the signal of the bit is judged to be random number code 2. The incoincident shared basis is again compared with the random basis of the next received signal. When the shared basis coincides with the random basis, the signal of the bit is treated as random number code 1, and the next shared basis is processed. When a basis is misjudged, the parities of the following bits become errors with a probability of 1/2, and therefore, the area including the misjudged position is specified. The basis-correcting processes are the same as those in the first embodiment. The example of the cases with and without a basis-judgment error is shown in the right-hand side of FIG. 11. In this example, the second bit from the left is misjudged at the basis-judgment process (shown by an underline at the receiving side), and the signal that is originally random number code 1 is decided as random number code 2. For this reason, the number of random number code 1 is reduced and the bit string becomes completely different from the original one. In the example of FIG. 11, the bit positions of random number codes 1 and 2 are completely changed due to the basis-judgment error from the original positions. In this case, the following parity checks become errors with a probability of 1/2 and the area including the basis-misjudged bit is found. After the area is specified, the correction of a basis of each bit and the following parity checks are repeated in sequence for the bits within the area, and random number codes 1 and 2 are recovered. The random number codes 1 and 2 at this stage have few bit errors, and decoding of the error correcting code is possible.

In the first method of the third embodiment shown in FIGS. 10 and 11, when the random number codes 1 and 2 are exchanged based on the correction of the basis in the receiver, the following random bases need to be compared with the shared bases again. As a result, the first method of the third embodiment has more processes than the method of the first embodiment, but the arrangement of the bases (basis string) for random number code 1 is completely decided with only the seed key. This is one advantage.

Figure 13:
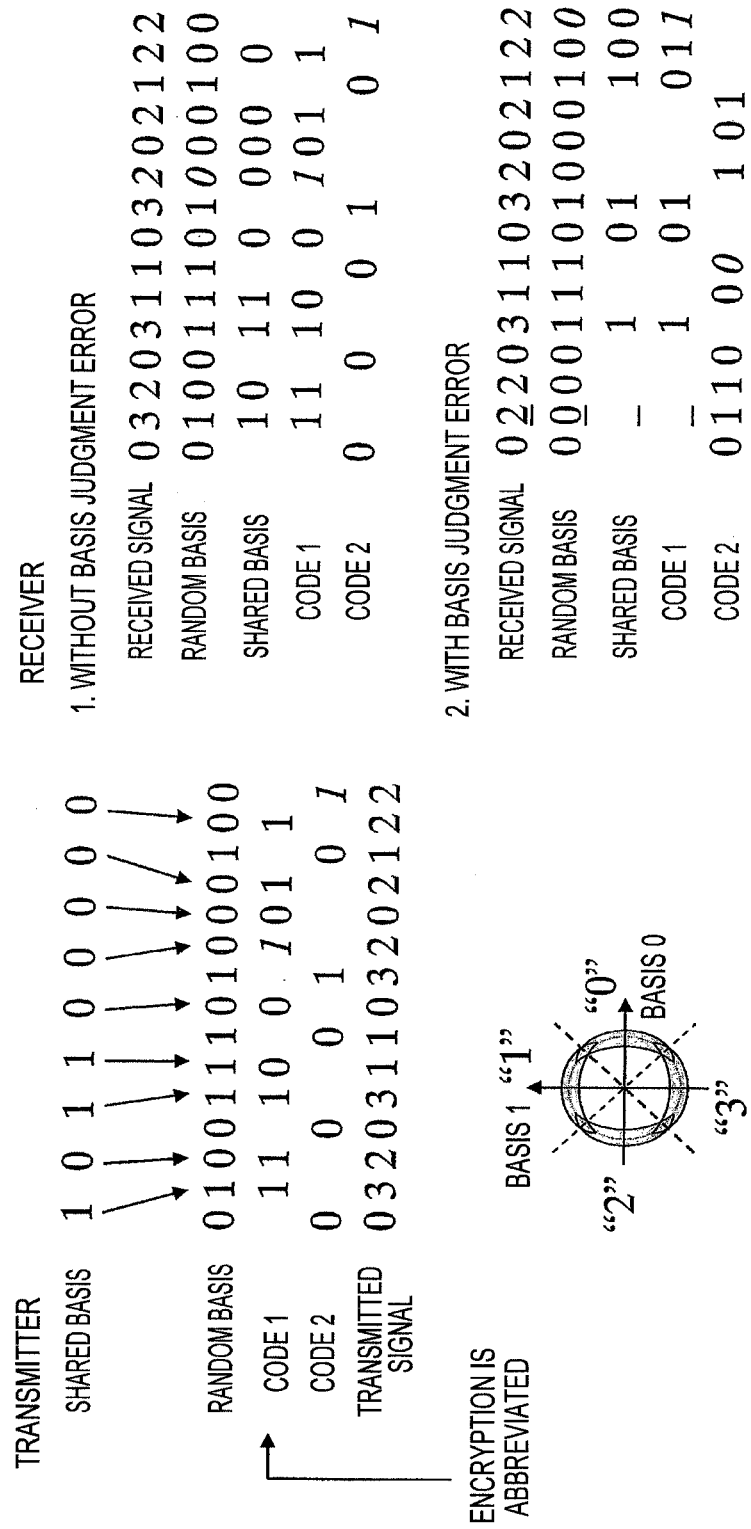
FIG. 13 is a diagram showing an example of signal treatment when the present invention is implemented based on the block diagram shown in FIG. 12.

The details of the second method of the third embodiment are shown in FIGS. 12 and 13. In this example, parity check symbols are included in random number codes 1 and 2. Italics in FIG. 13 indicate the check symbols. The underlined bit in the receiving side is the position at which the basis is misjudged. Random number code strings 1 and 2 are remarkably different from original bit strings. Although the parity is correct by chance in FIG. 13, it may be wrong with a probability of 1/2. According to the second method of the third embodiment, the present invention can be realized even if the error correcting code that does not separate information symbols from check symbols is used. Other effects of the present invention are the same as those of the first method.

Fourth Embodiment

The first to third embodiments disclose phase coding methods using two kinds of bases for binary signals. The methods of the present invention can be operated generally with n-value signal and m-kinds of bases (marked by n-value m-basis), where n and m are positive integers.

Figure 14:
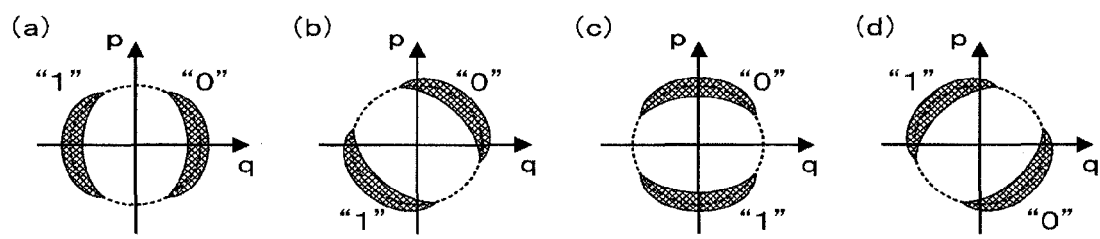
FIG. 14 is a diagram schematically showing binary signal states in phase space according to the fourth embodiment of the present invention, where four kinds of bases are used.

For example, FIG. 14 shows 2-value 4-basis phase-coded signal states in phase space as one type of the fourth embodiment. FIG. 14(*a*) represents the binary signal states on q-axis basis and FIG. 14(*b*) represents the binary signal states on the basis rotated by 45° from the q axis. FIG. 14(*c*) represents the binary signal states on p-axis basis and FIG. 14(*d*) represents the binary signal states on the basis rotated by −45° from the q axis. Because the present embodiment uses a binary random number signal with quaternary bases, the transmitted signal becomes eight values in appearance. Because a random basis and a shared basis each are quaternary and a signal is binary, the number of patterns for the random number data becomes 32 according to 4×4×2. Four kinds of bases of (a) to (d) are represented by a unit of two bits and codes 1 and 2 consisting of the binary random number signals are represented by a unit of one bit.

Figure 15:
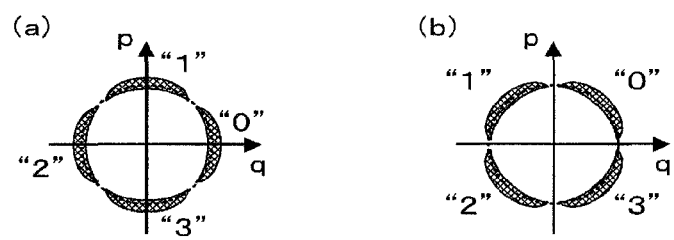
FIG. 15 is a diagram schematically showing quaternary signal states in phase space according to the fourth embodiment of the present invention, where two kinds of bases are used.

FIG. 15 shows 4-value 2-basis phase-coded signal states in phase space as another form of the fourth embodiment. FIG. 15(a) represents the quaternary signal states using q-axis and p-axis as a basis, and FIG. 15(b) represents the quaternary signal on the basis rotated by 45° from the case of FIG. 15(a). In the present embodiment, because the random number signal is quaternary and the basis is binary, the signal to be transmitted becomes eight values in appearance. The number of patterns for the random number data becomes 16 according to 2×2×4. Two kinds of bases (a) and (b) are represented by a unit of 1 bit and codes 1 and 2 consisting of quaternary random number signals are represented by a unit of 2 bits.

The effect in the present embodiment of the present invention is the same as that in the first to third embodiments.

Fifth Embodiment

There are common elements between the first to fourth embodiments described above. Here will describe more concrete examples of configurations about the common elements.

Figure 16:
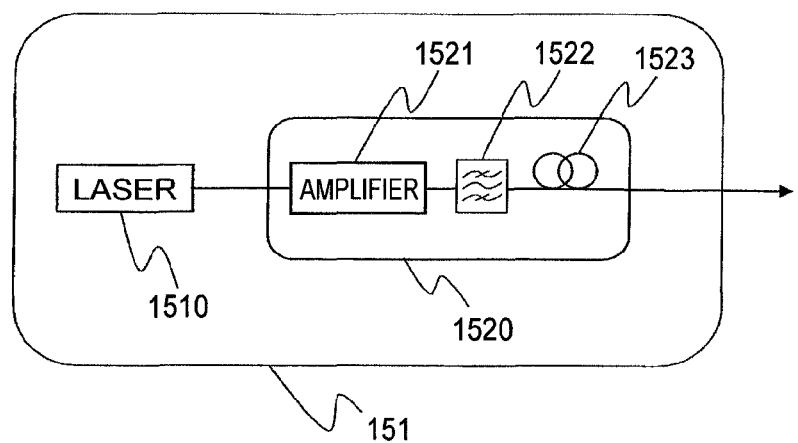
FIG. 16 is a block diagram showing an example of the configuration for generating fluctuated light according to the fifth embodiment of the present invention.

First, a fluctuated light source 151 will be described. Various types of fluctuated light sources are considerable. The method using the Kerr effect of optical fibers is convenient. FIG. 16 shows an example of it. FIG. 16 is a block diagram showing an example of the configuration for generating fluctuated light.

The output light from a laser light source 1510 is amplified with an amplifier 1521, passes a band pass filter 1522, and is propagated through an optical fiber 1523 inside fluctuation generator 1520. Phase fluctuations are added by the Kerr effect of the optical fiber through this propagation. The laser output light is relatively well described as a coherent state. The shape of fluctuations in phase space is a circle in this case. The shape becomes elliptic due to the Kerr effect of the optical fiber and moreover becomes a crescent shape after the further propagation. Such light that the shape of fluctuations is elliptic or a crescent shape is referred to as antisqueezed light (T. Tomaru, and M. Ban, "Secure optical communication using antisqueezing," Phys. Rev. A 74, 032312 (2006), and T. Tomaru, "LD light antisqueezing through fiber propagation in reflection-type interferometer," Opt. Exp. 15, 11241 (2007)).

Because the Kerr effect increases linearly with light intensity, it is preferable to increase the peak intensity by using pulse light. In this case, pulse broadening caused by the fiber propagation should be suppressed. This is achieved by satisfying the Soliton condition through appropriately selecting the pulse width, the light intensity, and the dispersion of the fiber (see Patent Document 2). When the light intensity is still increased more than the above value for the Soliton condition, the condition will satisfy that for a high-order Soliton (see Patent Document 2). In this case, the pulse is compressed, and therefore, the Kerr effect is strengthened. Moreover, the spectral width is expanded due to the pulse compression, which further increases the effect of fluctuations because the expansion of spectra causes an effect similar to phase fluctuations in phase measurement.

AS similar to the Kerr effect, Raman effect is effective for the expansion of phase fluctuations.

Figure 17:
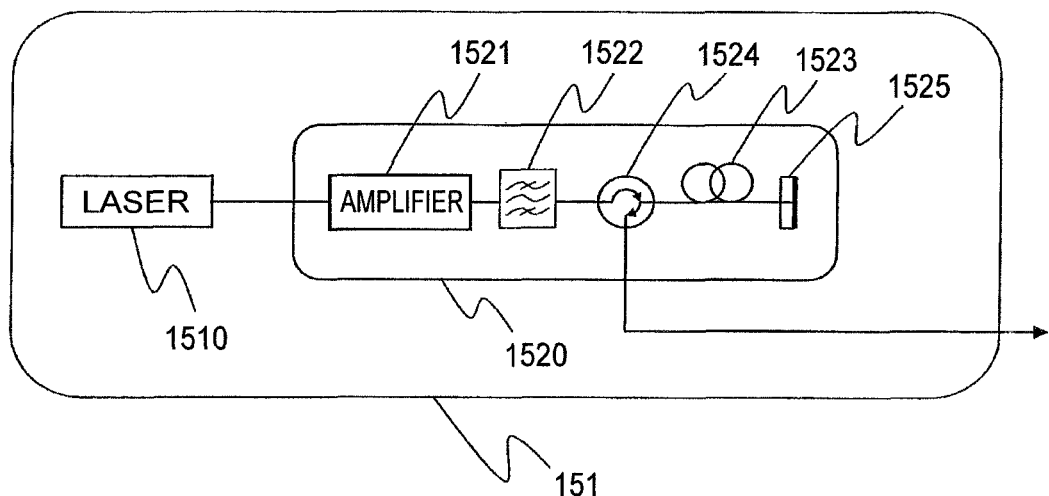
FIG. 17 is a block diagram showing another example of the configuration for generating fluctuated light according to the fifth embodiment of the present invention.

FIG. 17 is a block diagram showing another example of the configuration for generating the fluctuated light. The fiber propagation is reciprocated using an optical circulator 1524 and a Faraday mirror 1525 in FIG. 17. The fiber length can be reduced to half according to the present embodiment. Furthermore, this embodiment has another advantage. When the round trip propagation system includes a Faraday mirror, the polarization rotates just by 90' through the round-trip propagation, independent of the polarization state in fiber 1523. This property stabilizes the output polarization of the fluctuation generator. In addition, there is an option that the fiber interferometer is mounted in the fluctuation generator 1520. The ratio of phase fluctuations to amplitude can be increased through the interference. This is an effective method to increase the effect of phase fluctuations (see T. Tomaru, "LD light antisqueezing through fiber propagation in reflection-type interferometer," Opt. Exp. 15, 11241 (2007)).

Phase fluctuations have been generated with the Kerr effect or the Raman effect in optical fibers in the above description. Phase fluctuated light can be directly obtained from a laser diode (LD). When an LD is operated at near threshold, phase fluctuations are large. The property can be used as one method to obtain fluctuated light.

Figure 18:
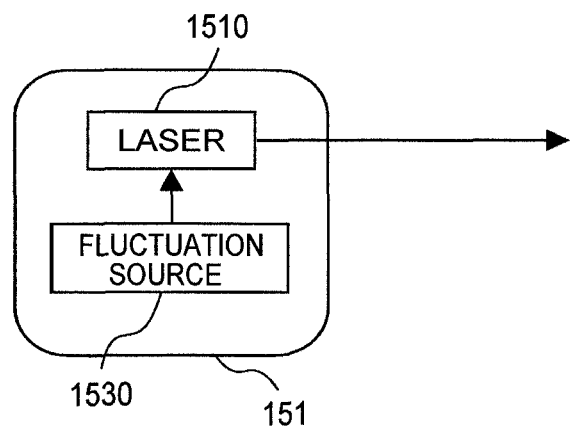
FIG. 18 is a block diagram showing an example of the configuration that equivalently realizes a fluctuated light source through adding fluctuations to a laser according to the fifth embodiment of the present invention.

An LD is operated with injection current. When fluctuations (noise) are superimposed on the injection current, fluctuated output is obtained and its fluctuations work as similarly as those of the light source itself. FIG. 18 shows an example of the case, i.e., FIG. 18 is a block diagram showing an example of the configuration for the light source 151 where fluctuations are added into a laser 1510. This configuration equivalently realizes the fluctuated light source. As a fluctuation source 1530, for example, thermal fluctuations can be considered. Or, because fluctuations may be considered to be an analogue random number, a multi-valued output from a random number generator can be equivalently used in the sense of analog-to-digital transform.

Figure 19:
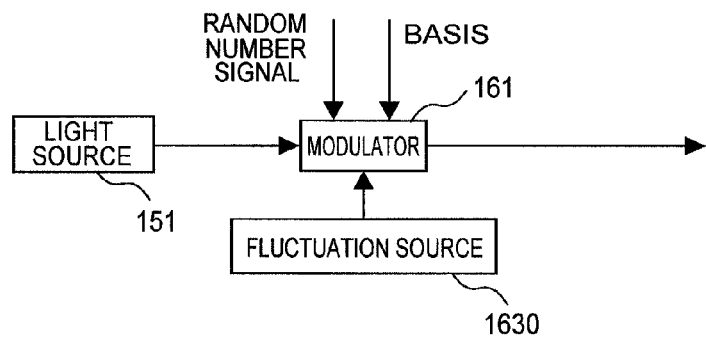
FIG. 19 is a block diagram showing an example of the configuration that equivalently realizes a fluctuated light source through adding fluctuations to carrier light at a modulator according to the fifth embodiment of the present invention.

Adding fluctuations can also be performed in modulator 161. The modulator 161 is originally installed for signal coding, but fluctuations can be simultaneously superimposed together with signals. Output fluctuations from the modulator work as equivalently as those from a fluctuated light source (FIG. 19). FIG. 19 is a block diagram showing an example of the configuration that equivalently realizes the fluctuated light source, where fluctuations are superimposed at a modulator. As a fluctuation-generating source 1630, thermal fluctuations are considered, or a multi-valued output from a random number generator is equivalently considered.

Sixth Embodiment

Figure 20:
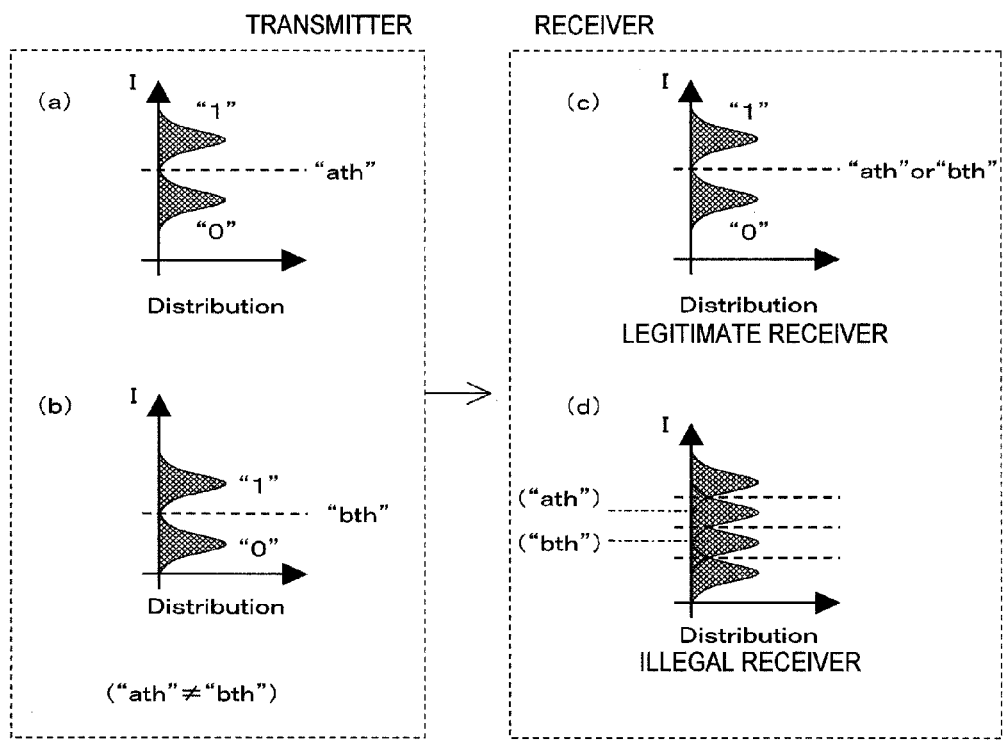
FIG. 20 is a diagram showing the intensity distribution of each intensity-coded signal state according to the sixth embodiment of the present invention.

So far, a phase coding method has been shown as an example. However, the present invention may be applied to an intensity-coding method. FIG. 20 shows the intensity distributions for signal states when this invention is operated in the intensity coding format with binary signals on two bases. The signal intensities of "0" and "1" changes depending on the basis for the intensity coding method. FIGS. 20(a) and 20(b) each show binary signal states, where the bases are different between FIGS. 20(a) and 20(b). The thresholds of "0" and "1" are ath in FIG. 20(a) and bth in FIG. 20(b). They are different because of the difference in basis. Because an illegal receiver does not know the basis, the signal state that he/she sees is quaternary as shown in FIG. 20(d), and the quaternary judgment is needed. Because the probability distributions overlap in this case, bit errors increase. Although a legitimate receiver knowing the bases first performs quaternary judgment in the judgment process as described in the first to third embodiments, his/her judgment becomes binary according to the information of threshold ath and bth in principle. The binary signal states in the situation of the legitimate receiver has little overlapping as shown in FIG. 20(c), and the legitimate receiver can perform binary judgment under this condition.

The phase coding method is the same as the intensity coding method in the fact that the binary judgment and the quaternary judgment are performed. Therefore, the signal processing for the phase coding method described in the first to fourth embodiments can be similarly performed for that of the intensity coding method in the sixth embodiment.

The effect for the present embodiment of the present invention is also the same as that for the first to third embodiments.

As described above, the embodiments of the present invention have been described by mainly referring to the phase-coding method as an example. However, the present invention works independent of a coding method, i.e., phase coding or intensity coding, as described in the sixth embodiment. In addition, although 2-value 2-basis coding has been mainly described as an example, the present invention can be applied to multi-value multi-basis coding, as described with reference to FIGS. 14 and 15.

Industrial Applicability

The present invention show that a secure secret key can be newly generated using a seed key and carrier light fluctuations. Although the present invention uses the seed key, the process of generating the secret key is performed information theoretically, and the origin of secret capacity comes from the fluctuations of carrier light. Therefore, the level of the security exceeds computational security, which releases us from the risk that an efficient cryptanalysis method may be found. The method according to the present invention can use the present optical network as it is, and therefore, it is practical and has high applicability. In addition, it is no need to discard the half of the transmitted signals, which is generally performed in quantum cryptography. The present invention has high industrial applicability based on these three reasons.

EXPLANATION OF REFERENCE NUMERALS

100 . . . Transmitter
101 . . . Random number generator
102 . . . Memory
103 . . . Random number data generating unit
104 . . . Random number signal transmitting unit
105 . . . Secret key generating unit
106 . . . Encryptor
111-113 . . . Random number generator
121-123 . . . Seed key
130 . . . Comparator
131, 132 . . . Buffer
141, 142 . . . Encoder for error correcting code
151 . . . Fluctuated light source
161 . . . Modulator
171, 172 . . . Privacy amplifier
181 . . . Encryptor
182 . . . Optical transmitter unit consists of a light source and a modulator
183 . . . Multiplexer
201 . . . First optical channel
202 . . . Second optical channel
300 . . . Receiver
302 . . . Random number code reproducing unit
303 . . . Memory
304 . . . Seed key generating unit
305 . . . Decryptor
311 . . . Signal detector
312 . . . Demodulator
313 . . . Basis coincidence check part
314 . . . Binary judging part
315 . . . Parity check part
316 . . . Parity correctness check part
321-323 . . . Seed key
341, 342 . . . Decoder for error correcting code
371, 372 . . . Privacy amplifier
381 . . . Detector
382 . . . Decryptor
383 . . . Demultiplexer
1510 . . . Laser
1520 . . . Fluctuation generator
1521 . . . Optical amplifier
1522 . . . Band pass filter
1523 . . . Optical fiber
1524 . . . Circulator
1525 . . . Faraday mirror
1530 . . . Fluctuation source
1630 . . . Fluctuation source

The invention claimed is:

1. A cryptographic communication system including
a transmitter and
a receiver connected with each other via a communication network,
wherein the transmitter stores information of shared bases shared between the transmitter and the receiver, and information of random bases stored at or generated by only the transmitter,
wherein the transmitter includes
a function that generates a random number datum from four kinds of information that are a first random number generated by a random number generator, a second random number generated by another random number generator, information of a shared basis, and information of a random basis;
a function that generates a random number signal through superimposing the random number datum on an output from an electromagnetic wave source using the random basis, and that transmits the generated random number signal to the receiver via a first channel in the communication network;
and a function that generates a secret key from the first random number and the second random number, encrypts real data to be transmitted using the secret key, and transmits the encrypted real data to the receiver via a second channel in the communication network,
wherein random number data is generated according to a rule that the first random number is adopted as a the random number signal when the random basis coincides with the shared basis, and that the second random number is adopted as a the random number signal when the random basis does not coincide with the shared basis,
wherein the receiver stores the information of the shared bases,
wherein the receiver includes
a function that judges the random basis and the random number data of the random number signal transmitted from the transmitter, compares the random basis with the shared basis, decides the random number signal as the first random number when the random basis coincides with the shared basis, and decides the random number signal as the second random number when the random basis does not coincide with the shared basis,
a function that differentiates between the first random number and the second random number based on judged results of a comparison between the random basis and the shared basis and produces the secret key from the differentiated first and second random numbers, and
a function that decodes the real data transmitted via the second channel into pre-decrypted real data using the secret key.

2. The cryptographic communication system according to claim 1, wherein the transmitter includes a memory that stores the information of the shared bases and the random bases, a random number data generating unit, a random number signal transmitting unit, a secret key generating unit, and an encryptor, where the random number signal transmitting unit has an electromagnetic wave source accompanied by fluctuations and a modulator, and generates random number signals by modulating the output from the electromagnetic wave source accompanied by the fluctuations according to the random number data, and transmits the random number signals to the receiver, the secret key generating unit generates the secret key from the first random numbers and the second random numbers, and the encryptor encrypts the real data to be transmitted using the secret key and outputs the encrypted real data to the second channel in the communication network, and the receiver includes a memory that stores the information of the shared bases, a detector that receives signal waves transmitted via the first channel, a random number code reproducing unit that decides the random basis and the random number value of the received random number signal, compares the random basis with the shared basis, and decides and separates the first random number and the second random number according to the compared result, a secret key generating unit that produces the secret key, and a decryptor that decrypts the encrypted real data into the pre-encrypted real data using the secret key.

3. The cryptographic communication system according to claim 2, wherein the secret key generating unit in the transmitter is constructed from a unit for privacy amplification, and generates the secret key by reducing a number of bits of the first and second random numbers that are the output from the random number generator.

4. The cryptographic communication system according to claim 2, wherein the secret key generating unit within the receiver is constructed from a unit for privacy amplification, and produces the secret key by reducing a number of bits of the first and second random numbers.

5. The cryptographic communication system according to claim 1, wherein the electromagnetic wave source is a light source, and the first and second channels are optical channels.

6. The cryptographic communication system according to claim 1, wherein the electromagnetic wave source is a high-frequency generator, and the first and second channels are electrical signal lines and free space with air.

7. The cryptographic communication system according to claim 1, further comprising an error correcting coding unit, wherein, the first random numbers and the second random numbers are error-correcting-coded, and an information symbols part and a parity check symbols part are separated from each other, and the random number code that is the information symbols part is transmitted to the receiver via the first channel, and the parity check symbols part is transmitted to the receiver via the second channel.

8. The cryptographic communication system according to claim 1, wherein the first random number and the second random number are error-correcting-coded and both of an information symbols part and a parity check symbols part are transmitted to the receiver via the first channel.

9. The cryptographic communication system according to claim 1, wherein the random basis and the shared basis are compared with each other in pairs bit-by-bit and whether the random basis and the shared basis coincide with each other or not determines whether to transmit the first random number or the second random number.

10. The cryptographic communication system according to claim 1, wherein the random basis and the shared basis are compared with each other in pairs bit-by-bit, and the first random number is transmitted when the random basis coincides with the shared basis and the second random number is transmitted when the random basis does not coincide with the shared basis, and furthermore, for the case that the shared basis does not coincide with the random basis, the same shared basis is repeatedly compared with a next random basis until the shared basis coincides with the next random basis.

11. The cryptographic communication system according to claim 1, wherein the random number signal output from the transmitter is accompanied by phase fluctuations or intensity fluctuations, where the signal output from the electromagnetic wave source includes the fluctuations or the fluctuations are added into the electromagnetic wave source or the fluctuations are added at a modulator.

12. The cryptographic communication system according to claim 1, wherein the transmitter and the receiver share first and second secret keys in advance, the transmitter has a first error correcting code encoder and a second error correcting code encoder, the receiver has a first error correcting code decoder and a second error correcting code decoder, in the transmitter, the first random number is encrypted using a first seed key and then is error-correcting-coded at the first error correcting code encoder, and the second random number is encrypted using a second seed key and then error-correcting-coded at the second error correcting code encoder, and in the receiver, the signal decoded at the first error correcting code decoder is decrypted into the first random number by using the first seed key, and the signal decoded at the second error correcting code decoder is decrypted into the second random number by using the second seed key.

13. The cryptographic communication system according to claim 1, wherein the first and second random numbers are binary, the random basis consists of two bases, and the random number signals is transmitted using net quaternary states.

14. The cryptographic communication system according to claim 1, wherein the first and second random numbers are n-values, the random basis consists of m-bases, and the random number signals is transmitted using net n×m-value states.

15. The cryptographic communication system according to claim 1, wherein the random basis and the shared basis are compared with each other bit-by-bit in the transmitter, and when the random basis coincides with the shared basis, the first random number is adopted as the random number signal, and when the random basis does not coincide with the shared basis, the second random number is adopted as the random number signal, and furthermore, when the random basis does not coincide with the shared basis, the shared basis of a bit is compared with the random basis of a next bit, and when the random basis coincides with the shared basis, the first random number is adopted as the random number signal, and when the random basis does not coincide with the shared basis, the second random number is adopted as the random number signal, and each bit of the shared bases is repeatedly compared with the random bases until the shared basis coincides with the random basis, and the random basis and the shared basis are similarly compared bit-by-bit in the receiver, and when the random basis coincides with the shared basis, the random number signal of the bit is adopted as the first random number, and when the random basis does not coincide with the shared basis, the random number signal of the bit is adopted as the second random number, and furthermore, when the random basis does not coincide with the shared basis, the shared basis of the bit is compared with the random basis of the next bit, and when the random basis coincides with the shared basis, the signal of the bit is adopted as the first random number, and when the random basis does not coincide with the shared basis, the signal of the bit is adopted as the second random number, and each bit of the shared bases is repeatedly compared with the random basis until the shared basis coincides with the random basis.

16. The cryptographic communication system according to claim 1, wherein the transmitter includes a first random number generator, a first error correcting code encoder, a second random number generator, a second error correcting code encoder, a third random number generator, a first light source, a first modulator, a unit for first privacy amplification, a unit for second privacy amplification, an encryptor, and an optical transmitter unit having a second light source and a second modulator, the receiver includes a first detector, a first error correcting code decoder, a second error correcting code decoder, a unit for first privacy amplification, a unit for second privacy amplification, a second detector, and a decryptor, the transmitter and the receiver share a seed key formed of random numbers in advance, and the seed key provides the transmitter and the receiver with the shared bases, in the transmitter, a first output from the first random number generator is error-correcting-coded as first random number signals at the first error correcting code encoder, and the first random number signals are separated into a first information part and a first redundant part, the former being defined as a first random number code and the latter being defined as first check symbols, and a second output from the second random number generator is error-correcting-coded as second random number signals at the second error correcting code encoder, and the second random number signals are separated into a second information part and a second redundant part, the former being defined as a second random number code and the latter being defined as second check symbols, a third output from the third random number generator is used as the random basis for transmitting the first random number code and the second random number code, where the first random number code is adopted as the random number signal when the random basis coincides with the shared basis, and the second random number code is adopted as the random number signal when the random basis does not coincide with the shared basis, the signal is superimposed on an output light from the first light source at the first modulator as a superimposed light using the random basis and the superimposed light is defined as a first signal light, where the output light from the first light source is accompanied by fluctuations or fluctuations are added to the output light at the first light source or the first modulator, and the first signal light is output to the first optical channel, the unit for first privacy amplification reduces a number of bits of the random number signals of the first output from the first random number generator and the unit for second privacy amplification reduces a number of bits of the random number signals of the second output from the second random number generator, the encryptor encrypts real data using the first and second output from the units for first and second privacy amplification as a secret key, the encrypted real data and the first and second check symbols are multiplexed to form multiplexed real data, and the multiplexed real data is superimposed on carrier light and the carrier light is output to a second optical channel from the optical transmitter unit as second signal light, and in the receiver, the second signal light is received with the second detector, and the encrypted real data and the first and second check symbols are separated from the received signals, the first signal light is received with the first detector, the random basis and a signal value are judged by comparing the received random basis with the shared basis, wherein the random number signal is treated as the first random number code when the received random basis coincides with the shared basis and the random number signal is treated as the second random number code when the received random basis does not coincide with the shared basis, the first random code is parity-checked using the first check symbols, a basis-judgment error is checked according to the parity check, the basis-judgment error is corrected if there is an error in a basis of the basis-judgment error, and according to the correction a judgment regarding whether the random number signal is the first random number code or the second random number code is corrected, where each signal value of the first random number code and second random number code that has been judged is also corrected, wherein the first random number code whose basis-judgment-error is corrected is decoded at the first error correcting code decoder using the first check symbols, and a number of bits of the decoded first random number code is reduced at the unit for first privacy amplification, the second random number code whose basis-judgment-error is corrected is decoded at the second error correcting code decoder using the second check symbols, and a number of bits of the decoded second random number code is reduced at the unit for second privacy amplification, the first and second outputs from the units for first and second privacy amplification are used as a secret key, and the encrypted real data is decrypted into the pre-encrypted real data at the decryptor using the secret key.

17. A transmitter of a cryptographic communication system connected to a receiver via a communication network, comprising:
a random number generator and an electromagnetic wave source, wherein
the transmitter stores information of shared bases shared between the transmitter and the receiver as well as random bases that are stored or generated only at the transmitter, the random number generator has a function that generates at least first random numbers and second random numbers, and the transmitter includes:
a function that generates random number data by adopting a first random number as a random number signal when a random basis coincides with a shared basis and by adopting a second random number as the random number signal when the random basis does not coincide with the shared basis,
a function that generates random number signals by superimposing the random number data on an output from the electromagnetic wave source using the random bases and transmits the generated random number signals to the receiver via a first channel in the communication network;
a function that generates a secret key from the first random numbers and the second random numbers,
encrypts real data to be transmitted using the secret key, and transmits the encrypted real data to the receiver via a second channel in the communication network.

18. The transmitter according to claim 17, wherein the electromagnetic wave source is a light source, and the first and second channels are optical channels.

19. The transmitter according to claim 17, wherein the first and second random numbers are n-values, the random bases consist of m-bases, and the random number signals are transmitted using net n×m-value states.

20. A receiver of a cryptographic communication system connected to a transmitter via a communication network having a first channel and a second channel, wherein the receiver:
stores information of shared bases that are shared between the receiver and the transmitter, and
includes
a function that judges a random basis and a random number value of a random number signal that is transmitted via the first channel from the transmitter and received by comparing the random basis with a shared basis and deciding the random number value as a judged first random number when the random basis coincides with the shared basis, and deciding the random number value as a judged second random number when the random basis does not coincide with the shared basis,
a function that produces a second secret key that is the same as a secret key generated in the transmitter from the judged first and second random number,
and a function that decrypts real data transmitted from the transmitter via the second channel into pre-encrypted real data using the second secret key.

* * * * *